(12) United States Patent
Kien et al.

(10) Patent No.: US 12,709,841 B2
(45) **Date of Patent: *Aug. 18, 2026**

(54) WEB MATERIAL STRUCTURING BELT, METHOD FOR MAKING AND METHOD FOR USING

(71) Applicant: The Procter & Gamble Company, Cincinnati, OH (US)

(72) Inventors: Kathryn Christian Kien, Cincinnati, OH (US); Jeffrey Glen Sheehan, Symmes Township, OH (US); Ward William Ostendorf, West Chester, OH (US); Laurent Jose Marie Bernard Mignot, Blue Ash, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/980,174

(22) Filed: Nov. 3, 2022

(65) Prior Publication Data

US 2023/0137354 A1 May 4, 2023

Related U.S. Application Data

(60) Provisional application No. 63/275,525, filed on Nov. 4, 2021.

(51) Int. Cl.
*D21F 7/08* (2006.01)
*B32B 3/30* (2006.01)
(Continued)

(52) U.S. Cl.
CPC ................ *D21F 7/083* (2013.01); *B32B 3/30* (2013.01); *B32B 5/022* (2013.01); *B32B 5/024* (2013.01);
(Continued)

(58) Field of Classification Search
CPC ......... D21F 7/083; D21F 11/006; B32B 3/30; B32B 5/022; B32B 5/024; B32B 5/073;
(Continued)

(56) References Cited

U.S. PATENT DOCUMENTS 3,546,054 A 12/1970 Ross
4,514,345 A 4/1985 Johnson et al.
(Continued)

FOREIGN PATENT DOCUMENTS

CA 2271863 A1 5/1998
DE 1958335 A1 5/1971
(Continued)

OTHER PUBLICATIONS

PCT Search Report and Written Opinion for PCT/US2022/079204 dated Feb. 24, 2023, 8 pages.
(Continued)

*Primary Examiner* — Jose A Fortuna
(74) *Attorney, Agent, or Firm* — Richard L. Alexander

(57) ABSTRACT

Web material structuring belts that impart structure to a web material during a web material structuring operation and/or structured web material forming operation, method for making same and methods for using same to make structured web materials, for example structured fibrous structures, such as structured sanitary tissue products such as structured toilet tissue, structured paper towels and structured facial tissue are provided.

14 Claims, 7 Drawing Sheets

(51) Int. Cl.

| | |
|---|---|
| ***B32B 5/02*** | (2006.01) |
| ***B32B 5/06*** | (2006.01) |
| ***B32B 5/26*** | (2006.01) |
| ***B32B 27/12*** | (2006.01) |
| ***D04H 1/732*** | (2012.01) |

(52) U.S. Cl.

CPC .............. *B32B 5/073* (2021.05); *B32B 5/275* (2021.05); *B32B 27/12* (2013.01); *D04H 1/732* (2013.01); *B32B 2250/20* (2013.01); *B32B 2307/748* (2013.01); *B32B 2433/00* (2013.01); *D10B 2505/00* (2013.01)

(58) Field of Classification Search

CPC ..... B32B 5/275; B32B 27/12; B32B 2250/20; B32B 2307/748; B32B 2433/00; D04H 1/732; D10B 2505/00

See application file for complete search history.

(56) References Cited

U.S. PATENT DOCUMENTS

| | | | | |
|---|---|---|---|---|
| 5,217,415 | A | 6/1993 | Wasylezuck et al. | |
| 5,789,052 | A | 8/1998 | Miller et al. | |
| 6,124,015 | A | 9/2000 | Baker et al. | |
| 6,440,881 | B1 | 8/2002 | Ercken | |
| 6,465,074 | B1 | 10/2002 | Fitzpatrick et al. | |
| 6,576,090 | B1 | 6/2003 | Trokhan et al. | |
| 7,141,144 | B2 | 11/2006 | Rydin | |
| 8,216,427 | B2 * | 7/2012 | Klerelid | D21F 11/006 162/900 |
| 8,999,115 | B2 | 4/2015 | Salonen | |
| 9,359,723 | B2 * | 6/2016 | Walkenhaus | D21F 11/14 |
| 9,657,443 | B2 * | 5/2017 | Rekoske | D21H 27/005 |
| 11,619,005 | B2 | 4/2023 | Swaine et al. | |
| 12,325,956 | B2 * | 6/2025 | Kien | D21F 7/083 |
| 12,397,528 | B2 * | 8/2025 | Kien | D21F 11/006 |
| 2003/0221739 | A1 | 12/2003 | Billings | |
| 2004/0109960 | A1 | 6/2004 | Rydin | |
| 2004/0157045 | A1 | 8/2004 | Davenport | |
| 2007/0209770 | A1 | 9/2007 | Barrett et al. | |
| 2010/0065234 | A1 | 3/2010 | Klerelid | |
| 2010/0193149 | A1 * | 8/2010 | Quigley | D21F 1/0027 162/358.1 |
| 2011/0088859 | A1 | 4/2011 | Hultcrantz et al. | |
| 2011/0155340 | A1 * | 6/2011 | Quigley | D21F 3/0272 162/205 |
| 2013/0295328 | A1 | 11/2013 | Baran, Jr. et al. | |
| 2014/0345822 | A1 * | 11/2014 | Walkenhaus | D21F 1/80 162/358.1 |
| 2015/0211178 | A1 | 7/2015 | Barrett | |
| 2016/0069022 | A1 | 3/2016 | Lee | |
| 2016/0145810 | A1 * | 5/2016 | Miller, IV | D21H 21/18 162/111 |
| 2018/0119350 | A1 * | 5/2018 | Brent, Jr | D21F 11/006 |
| 2019/0374388 | A1 * | 12/2019 | Giovanni | A61F 13/51462 |
| 2020/0079054 | A1 | 3/2020 | Fujiwara | |
| 2020/0270811 | A1 | 8/2020 | Eberhardt et al. | |
| 2020/0360190 | A1 * | 11/2020 | Ashraf | D04H 3/007 |
| 2022/0325474 | A1 | 10/2022 | Burazin et al. | |
| 2023/0137354 | A1 * | 5/2023 | Kien | D21F 7/083 162/212 |
| 2023/0137439 | A1 * | 5/2023 | Kien | D21F 7/083 162/358.2 |
| 2023/0138090 | A1 * | 5/2023 | Kien | B32B 7/05 428/103 |
| 2023/0138680 | A1 * | 5/2023 | Kien | B32B 5/022 162/212 |
| 2023/0139935 | A1 * | 5/2023 | Kien | B32B 5/024 428/98 |
| 2023/0140783 | A1 * | 5/2023 | Kien | D21F 11/006 428/114 |
| 2024/0271364 | A1 | 8/2024 | Rhett et al. | |
| 2024/0301625 | A1 | 9/2024 | Sealey et al. | |
| 2024/0368837 | A1 * | 11/2024 | Kien | D21F 7/10 |
| 2025/0277337 | A1 * | 9/2025 | Kien | D21F 7/083 |
| 2025/0361720 | A1 | 11/2025 | Kien et al. | |

FOREIGN PATENT DOCUMENTS

| | | | | |
|---|---|---|---|---|
| DE | 112022005305 | T5 * | 8/2024 | D04H 1/732 |
| DE | 112022005274 | T5 * | 11/2024 | B32B 5/022 |
| DE | 112022005275 | T5 * | 11/2024 | D21F 11/006 |
| GB | 2627401 | A * | 8/2024 | B32B 27/12 |
| JP | S54158080 | U | 11/1979 | |
| KR | 101436282 | B1 * | 8/2014 | A45D 44/002 |
| WO | 9807926 | A2 | 2/1998 | |
| WO | 9966124 | A1 | 12/1999 | |
| WO | 2010030298 | A1 | 3/2010 | |
| WO | 2013083773 | A1 | 6/2013 | |
| WO | 2014172594 | A1 | 10/2014 | |
| WO | 2017178414 | A1 | 10/2017 | |
| WO | 2019028052 | A1 | 2/2019 | |
| WO | WO-2023081746 | A1 * | 5/2023 | B32B 27/12 |
| WO | WO-2023081747 | A1 * | 5/2023 | B32B 27/12 |
| WO | WO-2024229080 | A1 * | 11/2024 | B32B 7/12 |

OTHER PUBLICATIONS

Unpublished U.S. Appl. No. 17/980,038, filed Nov. 3, 2022, to Kathryn Christian Kien et al.

Unpublished U.S. Appl. No. 17/980,063, filed Nov. 3, 2022, to Kathryn Christian Kien et al.

Unpublished U.S. Appl. No. 17/980,120, filed Nov. 3, 2022, to Kathryn Christian Kien et al.

Unpublished U.S. Appl. No. 17/980,208, filed Nov. 3, 2022, to Kathryn Christian Kien et al.

Unpublished U.S. Appl. No. 17/980,087, filed Nov. 3, 2022, to Kathryn Christian Kien et al.

All Office Actions; U.S. Appl. No. 19/206,108, filed May 13, 2025.

Unpublished U.S. Appl. No. 19/206,108, filed May 13, 2025, to Kathryn Christian Kien et al.

Final Office Action; U.S. Appl. No. 17/980,087 dated Feb. 13, 2024.

Final Office Action; U.S. Appl. No. 17/980,120 dated Feb. 13, 2024.

Non-Final Office Action; U.S. Appl. No. 17/980,038 dated Sep. 16, 2024.

Non-Final Office Action; U.S. Appl. No. 17/980,063 dated Aug. 19, 2024.

Non-Final Office Action; U.S. Appl. No. 17/980,087 dated Jun. 5, 2023.

Non-Final Office Action; U.S. Appl. No. 17/980,120 dated Jun. 6, 2023.

Gary A. Smook, Handbook for Pulp and Paper Technologists, Angus Wilde Publications, Second Edition, 2001, pp. 308-322.

Final Office Action; U.S. Appl. No. 17/980,120, dated Aug. 25, 2025; See Patent Center.

Final Office Action; U.S. Appl. No. 17/980,208, dated Sep. 17, 2025; See Patent Center.

Non-Final Office Action; U.S. Appl. No. 17/980,087, dated Oct. 23, 2025; See Patent Center.

Non-Final Office Action; U.S. Appl. No. 17/980,120, dated Mar. 14, 2025; See Patent Center.

Non-Final Office Action; U.S. Appl. No. 17/980,208, dated Feb. 26, 2025; See Patent Center.

Notice of Allowance; U.S. Appl. No. 17/980,038, dated Apr. 30, 2025; See Patent Center.

Notice of Allowance; U.S. Appl. No. 17/980,063, dated Feb. 11, 2025; See Patent Center.

Notice of Allowance; U.S. Appl. No. 17/980,120, dated Jan. 28, 2026; See Patent Center.

* cited by examiner

WEB MATERIAL STRUCTURING BELT, METHOD FOR MAKING AND METHOD FOR USING

FIELD OF THE INVENTION

The present invention relates to web material structuring belts, and more particularly to web material structuring belts that impart texture, for example structure, to a web material during a web material structuring operation and/or structured web material forming operation, method for making same and methods for using same to make structured web materials, for example structured fibrous structures, such as structured sanitary tissue products such as structured toilet tissue, structured paper towels, structured facial tissue, structured wipes, for example structured wet wipes, and/or structured components of absorbent products, such as structured top sheets for diapers and/or feminine hygiene products and/or adult incontinence products.

BACKGROUND OF THE INVENTION

Web material structuring belts, for example laminated papermaking belts comprising a structuring layer (for imparting structure to a fibrous structure during a fibrous structure making process) laminated to a support layer are known in the art. However, such known papermaking belts exhibit negatives associated with lamination strength and/or lamination quality that impact durability and functional life of the papermaking belts due to the process conditions encountered during the structured fibrous structure papermaking processes. In addition to the problems with lamination, such known structuring papermaking belts may also result in less than sufficient and/or efficient drying of the structured fibrous structures made on the known structuring papermaking belts, for example wet-laid structured fibrous structures made on such structuring papermaking belts. Known structuring papermaking belts may also interfere with formation of structure in the fibrous structures being formed by either or both over-structuring and pulling fibers into the support layer and/or by under-structuring and not maximally realigning the fibers to impart structure into the fibrous structures being formed.

In addition to the above problems with the known structuring papermaking belts, the known structuring papermaking belts create negatives on and/or within the structured fibrous structures formed on the known structuring papermaking belts. For example, where and how the bonds used to laminate the structuring layer to the support layer in the known structuring papermaking belts creates negatives within the structured fibrous structures made on such known structuring papermaking belts. In one example, as shown in Prior Art FIGS. 1A, 1B, 2A, 2B, 3A and 3B, the structuring layer of the known structuring papermaking belt is bonded to the support layer of the known structuring papermaking belt at the interface between the structuring layer and the support layer, which results in the fibers of the structured fibrous structure forming around those bonds during the fibrous structure structuring operation thus creating imperfections in the structure fibrous structure. Such imperfections in the structured fibrous structure would be at or near a surface of the structure fibrous structure, such as a web material structuring belt side of the structured fibrous structure and/or a consumer contacting side of the structured fibrous structure.

As shown in Prior Art FIGS. 1A-3B, examples of known laminated structure-imparting papermaking belts comprise a structuring layer that is laminated to a support layer at an interface between the structuring layer and the support layer, for example at a surface of the support layer, where the structuring layer does not penetrate into the support layer and/or vice versa. These known laminated structure-imparting papermaking belts are designed to laminate the structuring layer to a surface of the support layer and not to envelope and/or wrap components of the support layer, for example yarns and/or threads and/or filaments of the support layer. The structuring layers of the known laminated structure-imparting papermaking belts fail to extend into the support layers sufficiently, in fact, they fail to extend in the support layer greater than the thickness of a yarn and/or thread and/or filament of the surface of the support layer (the top-most yarns, threads, and/or filaments of the support layer.

As shown in Prior Art FIGS. 4A-4C, one known laminated papermaking belt comprises a structuring layer that is laminated to a support layer by the structuring layer extending entirely through the support layer, which negatively impacts air perm through the support layer and the laminated papermaking belt.

Accordingly, known problems with known structure-imparting papermaking belts include delamination of the structuring layer from the support layer, inability to run faster speeds, inability to survive high process temperatures, which may lead to increased oxidation and/or increased material fatigue, and/or inability to run for longer periods of time during the structured fibrous structure papermaking process due to insufficient strength and/or integrity of such known structure-imparting papermaking belts, insufficient air flow to achieve faster run speeds and/or cost effective drying during the structured fibrous structure papermaking process, excessively low air permeability to achieve structuring, for example molding, of the fibrous structure into the structure-imparting papermaking belt, and/or issues with generating sufficient force to rearrange the fibrous elements, for example fibers, into the structure-imparting papermaking belt, unnecessarily high air perm so that structuring, for example molding, of the fibrous structure into the structure-imparting papermaking belt results in fibers penetrating into or through the support layer resulting in fiber build-up in the papermaking process.

In light of the foregoing, there exists a need for a web material structuring belt that overcomes the negatives associated with known web material structuring belts, especially known laminated structuring papermaking belts discussed above.

SUMMARY OF THE INVENTION

The present invention fulfills the needs described above by providing web material structuring belts for imparting texture, for example structure, to a web material, for example a fibrous structure, for example a wet laid fibrous structure, which can be used to make a structured web material, such as a structured fibrous structure, for example a structured sanitary tissue product, wherein the web material structuring belt comprises a support layer, a structuring layer and an associating layer, wherein at least a portion of the associating layer is associated with the support layer and the structuring layer such that the associating layer portion extends into, but does not extend entirely through the z-direction thickness of the support layer and/or the structuring layer, methods for making such web material structuring belts and methods for using such web material structuring belts to make structured web materials, such as a structured fibrous structures, for example a structured wet laid fibrous structures.

In addition to structured sanitary tissue products such as structured toilet tissue, structured paper towels, structured facial tissue, structured wipes, for example structured wet wipes, which may be made using the web material structuring belts of the present invention, nonwoven fabrics and/or nonwoven substrates comprising a first surface and a second surface and a visually discernible pattern of three-dimensional features on one of the first or second surface may also be made using the web material structuring belts of the present invention. Each of the three-dimensional features of such nonwoven fabrics and/or nonwoven substrates may define a microzone comprising a first region and a second region. The first and second regions may have a difference in values for an intensive property, wherein the intensive property may be one, two, or all three of the following: thickness, basis weight, and volumetric density. The thickness, basis weight, and volumetric density may all be greater than zero. Such nonwovens are described in PCT publication WO 2017/105997, U.S. Pat. Application Publication No. US 2018/0168893, U.S. Pat. Application Publication No. US 2018/0216271, U.S. Pat. Application Publication No. US 2018/0214318, U.S. Pat. Application Publication No. US 2020/0268572, U.S. Pat. Application Publication No. US 2020/0299880, and U.S. Pat. Application Publication No. US 2021/0369511. The web material structuring belts of the present invention may also be used to generate nonwoven fabrics and substrates via the spunbond process as described in U.S. Pat. Application Publication No. US 2017/0314163. In one example, the web material structuring belts of the present invention may also be used to generate nonwoven fabrics and/or nonwoven substrates as described in the records incorporated by reference and may also be consolidated and converted using through air bonding to create a through air bonded, spunbond nonwoven.

One solution to the problems identified above with known laminated web material structuring belts, for example known laminated structure-imparting papermaking belts, is to provide better lamination properties and/or better control of lamination (to impact air permeability and/or structuring/molding properties of the web material structuring belts) between the structuring layer and support layer of the web material structuring belts by providing one or more of the following: 1) improved penetration and/or impregnation and/or embedment of at least a portion of the associating layer into the support layer and/or at least a portion of the associating layer into the structuring layer and/or at least a portion of the associating layer into both the support layer and the structuring layer, 2) better adhesion between at least a portion of the associating layer and at least a portion of the structuring layer and/or at least a portion of the support layer, 3) wrapping and/or enveloping of one or more components, for example yarns, threads, and/or filaments and/or other physical features, such as particles and/or additive manufacturing elements, of the support layer by at least a portion of the associating layer, for example wrapping and/or enveloping at least a portion of the yarns, threads and/or filaments and/or other physical features, such as particles and/or additive manufacturing elements, of the support layer (for example at least the yarns, threads and/or filaments and/or other physical features, such as particles and/or additive manufacturing elements, of, at a minimum, the surface of the support layer that is associated with the associating layer, for example the "top-most" (exterior surface of the support layer in contact with the associating layer) yarns, threads and/or filaments an of the support layer) by at least a portion of associating layer such that the support layer is enabled to bear at least a portion of the load of any delamination force and the similar situation where the associating layer extends into the structuring layer, 4) wrapping and/or enveloping of one or more components, for example yarns, threads and/or filaments and/or other physical features, such as particles and/or additive manufacturing elements, of the structuring layer by at least a portion of the associating layer, for example wrapping and/or enveloping at least a portion of the yarns, threads and/or filaments and/or other physical features, such as particles and/or additive manufacturing elements, of the structuring layer (for example at least the yarns, threads and/or filaments of, at a minimum, the surface of the structuring layer that is associated with the associating layer, for example the "bottom-most" (exterior surface of the structuring layer in contact with the associating layer) yarns, threads and/or filaments and/or other physical features, such as particles and/or additive manufacturing elements, of the structuring layer) by at least a portion of associating layer such that the structuring layer is enabled to bear at least a portion of the load of any delamination force, 5) wrapping and/or enveloping of one or more components, for example yarns, threads and/or filaments and/or other physical features, such as particles and/or additive manufacturing elements, of the support layer and the structuring layer by at least portions of the associating layer, for example wrapping and/or enveloping at least a portion of the yarns, threads and/or filaments and/or other physical features, such as particles and/or additive manufacturing elements, of the support layer and the structuring layer (for example at least the yarns, threads and/or filaments and/or other physical features, such as particles and/or additive manufacturing elements, of, at a minimum, the surface of the support layer and the structuring layer that is associated with the associating layer, for example the "top-most" (exterior surface of the support layer in contact with the associating layer) yarns, threads and/or filaments and/or other physical features, such as particles and/or additive manufacturing elements, of the support layer and the "bottom most" (exterior surface of the structuring layer in contact with the associating layer) yarns, threads and/or filaments and/or other physical features, such as particles and/or additive manufacturing elements, of the structuring layer) by at least a portion of associating layer such that the support layer and/or the structuring layer is enabled to bear at least a portion of the load of any delamination force, 6) increased contact area between at least a portion of the associating layer and at least a portion of the support layer and/or at least a portion of the structuring layer, 7) improved selective bonding between at least a portion of the associating layer and at least a portion of the structuring layer and/or at least a portion of the support layer, 8) including alternative function layers, such as air perm function layers that improve the lamination properties and/or operational properties of the web material structuring belts, 9) ability to associate, for example bond, incompatible material layers, for example support layer and structuring layer by using an additional material, an associating layer comprising a material that is compatible with one or both of the support layer material and the structuring layer material, and 10) creating void volumes, for example air gaps, between layers, for example between the support layer and the structuring layer and/or optionally, the associating layer, when present.

Without being bound by theory, the use of one or more of the above-identified solutions to produce a web material structuring belt that can be used to produce a web material, for example a structured web material, at faster speeds and higher temperatures and effectively structure the web material by imparting desired fibrous element realignment while still drying the web material effectively and efficiently.

In one example of the present invention, a web material structuring belt comprising:

a. a support layer, for example 1) a support layer that exhibits an air perm of greater than 400 scfm and/or greater than 500 scfm and/or greater than 600 scfm and/or greater than 700 scfm and/or greater than 800 scfm and/or to about 1500 scfm and/or to about 1400 scfm and/or to about 1300 scfm and/or to about 1200 scfm and/or to about 1100 scfm and/or to about 1000 scfm and/or 2) a non-batted support layer, for example a non-felt support layer, for example a woven support layer, such as a woven fabric; and b. a structuring layer associated with the support layer such that one or more void volumes is present between the support layer and the structuring layer, is provided.

In another example of the present invention, a web material structuring belt comprising:

a. a support layer;

b. a structuring layer; and c. an associating layer that associates the structuring layer with the support layer such that one or more void volumes is present between the structuring layer and the support layer, is provided.

In another example of the present invention, a method for making a web material structuring belt, the method comprising the steps of:

a. providing a support layer;

b. providing a structuring layer;

c. providing an associating layer; and d. associating the structuring layer with the support layer by the associating layer such that a web material structuring belt comprising one or more void volumes between the structuring layer and the support layer is formed, is provided.

In another example of the present invention, a method for making a web material structuring belt, the method comprising the steps of:

a. providing a support layer;

b. providing a structuring layer;

c. providing an associating layer; and d. associating the structuring layer with the support layer by the associating layer such that a web material structuring belt comprising one or more void volumes between the structuring layer and the support layer is formed, is provided.

In another example of the present invention, a method for making a web material structuring belt, the method comprising the steps of:

a. providing a structuring layer;

b. providing a support layer;

c. forming an associating layer on the structuring layer; and d. associating the support layer with the associating layer such that a web material structuring belt comprising one or more void volumes between the structuring layer and the support layer is formed, is provided.

A method for making a fibrous structure, the method comprises the step of depositing a plurality of fibrous elements onto a web material structuring belt according to the present invention such that a web material, for example a structured web material is formed, is provided.

A structured web material made by a method according to the present invention, is provided.

In another example of the present invention, a method for making a web material structuring belt, the method comprising the steps of:

a. providing a support layer;

b. providing a structuring layer; and c. associating the structuring layer with the support layer such that a web material structuring belt comprising one or more void volumes between the structuring layer and the support layer is formed, is provided.

In another example of the present invention, a method for making a web material structuring belt, the method comprising the steps of:

a. providing a support layer;

b. forming a structuring layer on the support layer such that a web material structuring belt comprising the one or more void volumes between the structuring layer and the support layer is formed, is provided.

In another example of the present invention, a method for making a web material structuring belt, the method comprising the steps of:

a. providing a structuring layer; and b. forming a support layer on the structuring layer such that a web material structuring belt comprising one or more void volumes between the structuring layer and the support layer is formed, is provided.

In another example of the present invention, a method for making a structured web material, the method comprises the step of depositing a plurality of fibrous elements onto a web material structuring belt according to the present invention such that a structured web material is formed, is provided.

In another example of the present invention, a structured web material made by the method for making a structured web material according to the present invention, is provided.

In yet another example of the present invention, a method for making a web material, for example a structured web material, the method comprising the step of depositing web material components, for example fibrous elements, such as fibers and/or filaments, and film-making components, onto a web material structuring belt according to the present invention such that a web material, for example a structured web material, is formed, is provided.

In still yet another example of the present invention, a method for making a fibrous structure, for example a structured fibrous structure, the method comprising the step of depositing a plurality of fibrous elements, for example fibers and/or filaments, onto a web material structuring belt according to the present invention such that a fibrous structure, for example a structured fibrous structure, is formed, is provided.

In even yet another example of the present invention, a method for making a wet laid fibrous structure, for example a structured wet laid fibrous structure, the method comprising the step of depositing a plurality of pulp fibers onto a web material structuring belt according to the present invention such that a wet laid fibrous structure, for example a structured wet laid fibrous structure, is formed, is provided.

In even still another example of the present invention, a method for making a film, for example a structured film, the method comprising the step of depositing a film-forming material onto a web material structuring belt according to the present invention such that a film, for example a structured film, is formed, is provided.

In another example of the present invention, a web material, for example a structured web material, for example a structured fibrous structure, such as a structured wet laid fibrous structure, for example a structured sanitary tissue product, formed according to a method of the present invention, is provided.

In another example of the present invention, a film, for example a structured film, formed according to a method of the present invention, is provided.

Accordingly, the present invention provides novel web material structuring belts, methods for making such web material structuring belts, methods for making web materials, for example structured web materials, for example structured fibrous structures, such as structured wet laid fibrous structures, such as structured sanitary tissue products, and web materials, for example structured web materials, for example structured fibrous structures, such as structured wet laid fibrous structures, such as structured sanitary tissue products made using the novel web material structuring belts and methods.

DETAILED DESCRIPTION OF THE INVENTION

Definitions

Figure 1A:
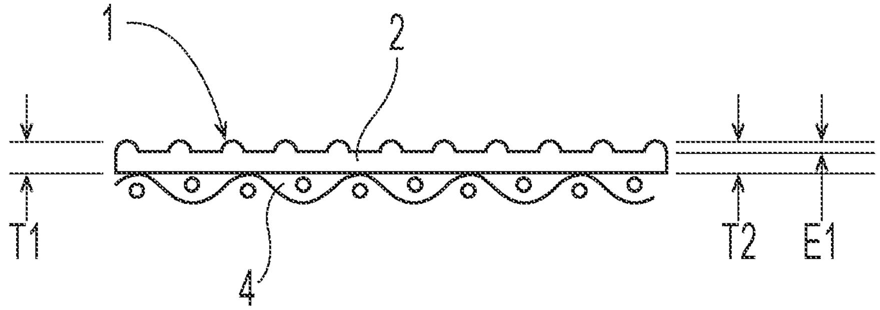
FIG. 1A is a cross-sectional view of an example of a prior art structuring papermaking belt as shown in U.S. Pat. No. 10,208,426.
Figure 1B:
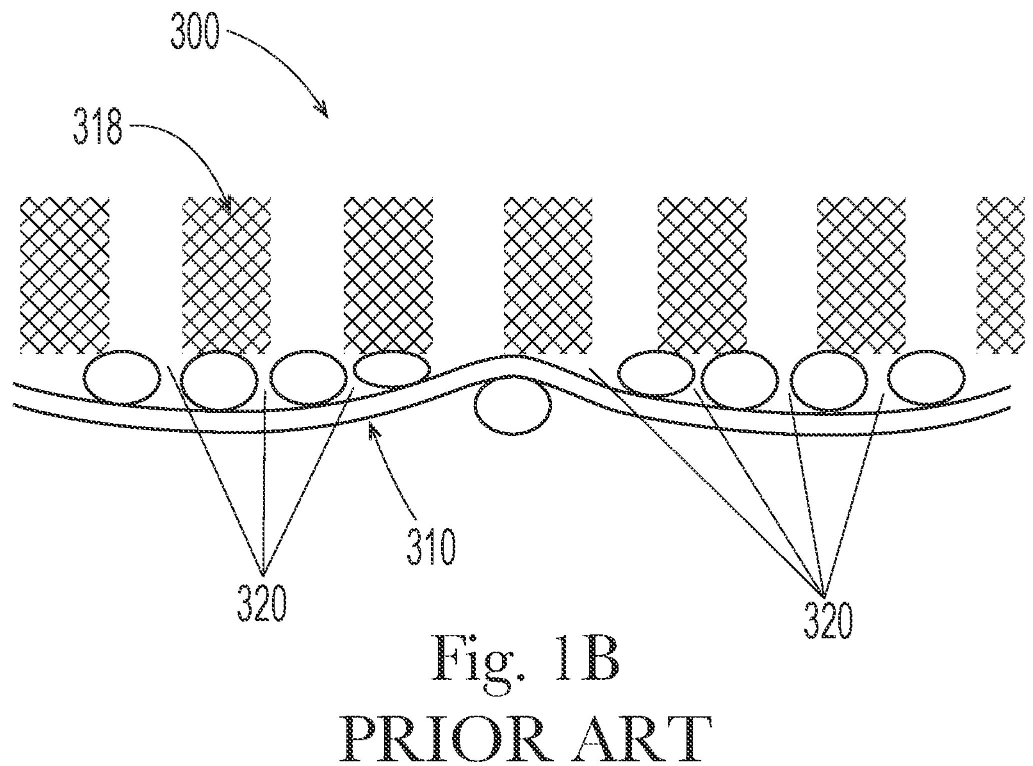
FIG. 1B is a cross-sectional view of an example of a prior art structuring papermaking belt as shown in U.S. Pat. No. 10,208,426.
Figures 2A, 2B:
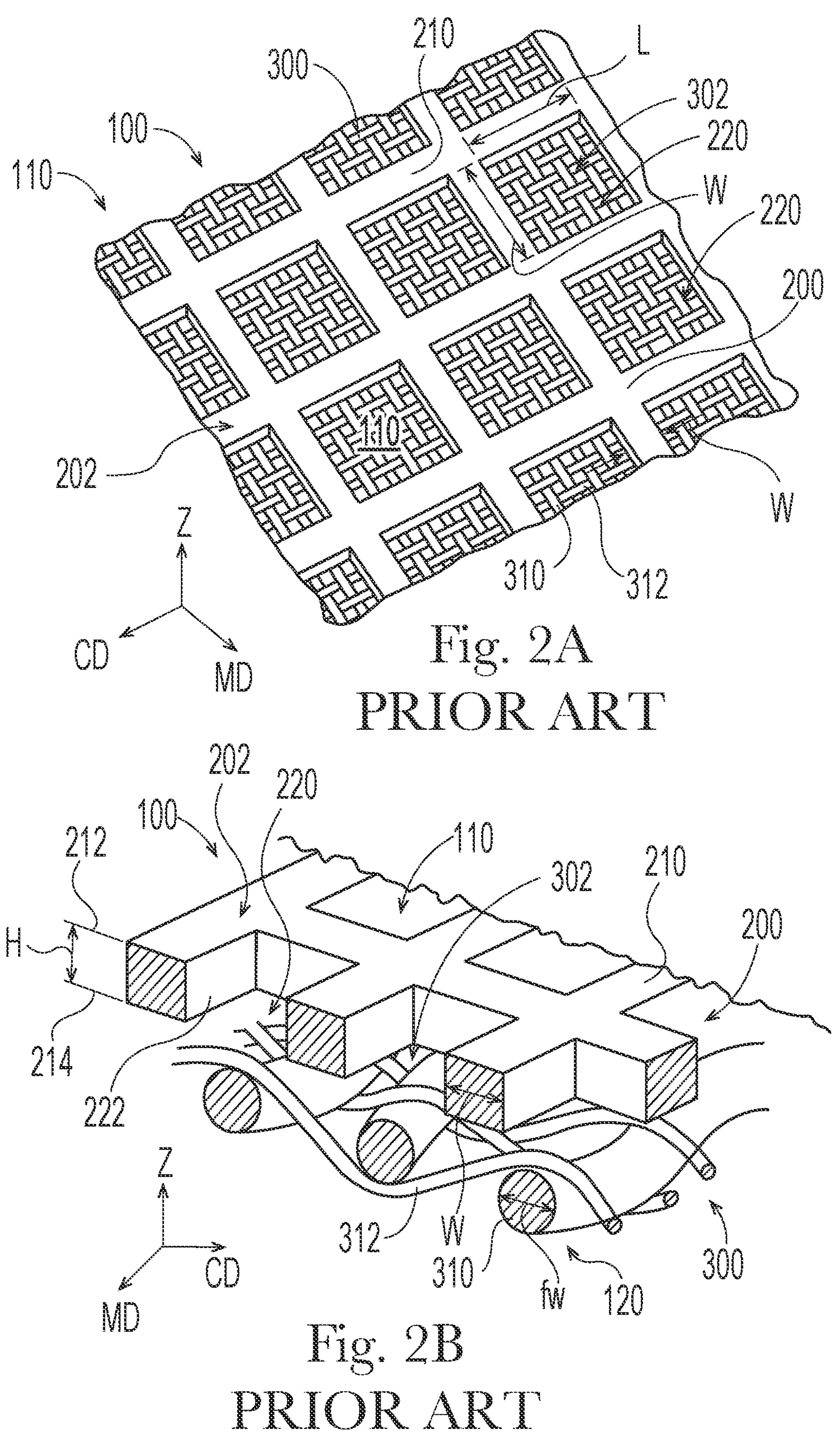
FIG. 2A is a top plan view of an example of a prior art structuring papermaking belt as shown in U.S. Pat. No. 10,584,444.
FIG. 2B is a detailed perspective view of the prior art structuring papermaking belt of FIG. 2A.
Figure 3A:
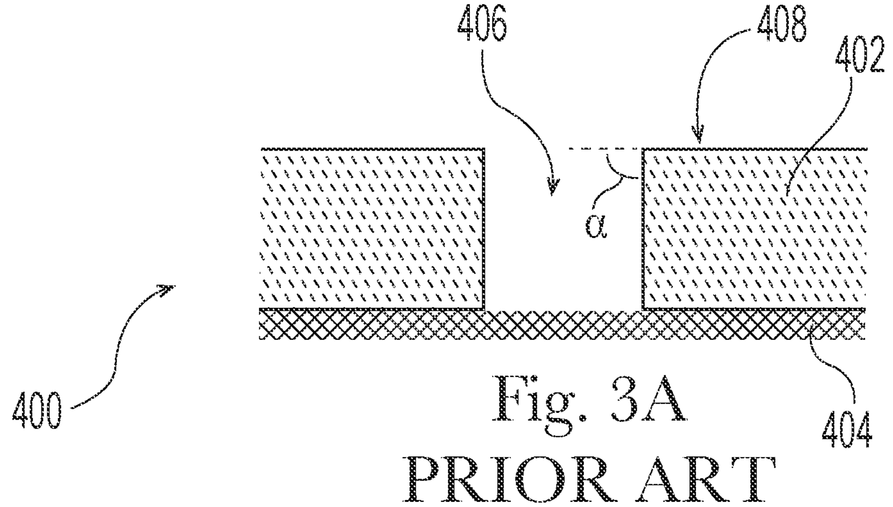
FIG. 3A is a cross-sectional view of a portion of an example of a prior art structuring papermaking belt as shown in U.S. Pat. No. 10,731,301.
Figure 3B:
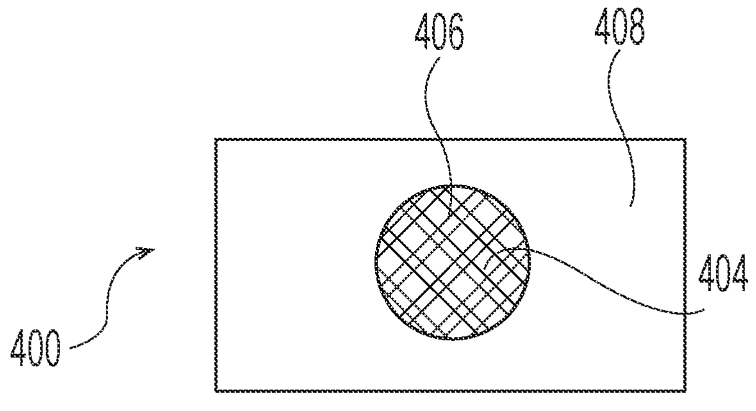
FIG. 3B is a top view of the portion of FIG. 3A.
Figure 4A:
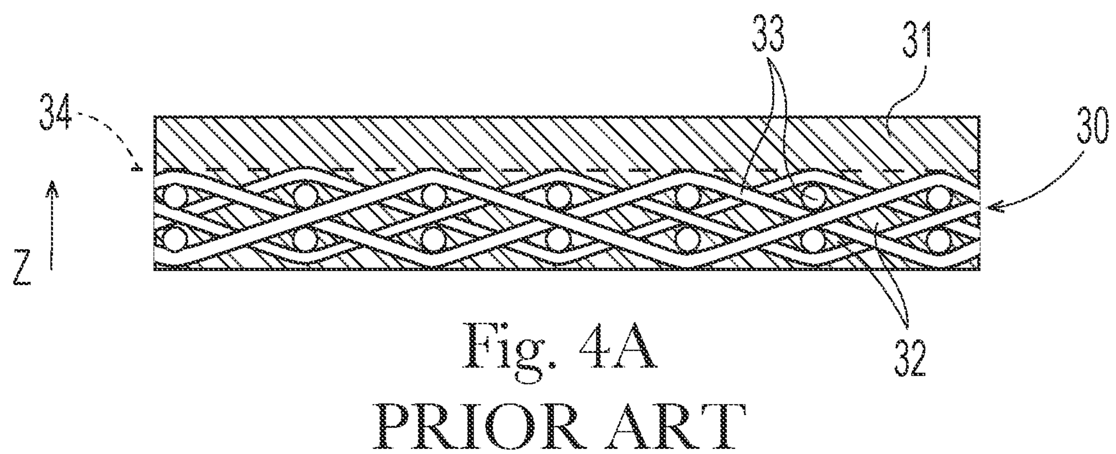
FIG. 4A is a cross-sectional view of an example of a prior art structuring papermaking belt as shown in WO 2021/154292.
Figure 4B:
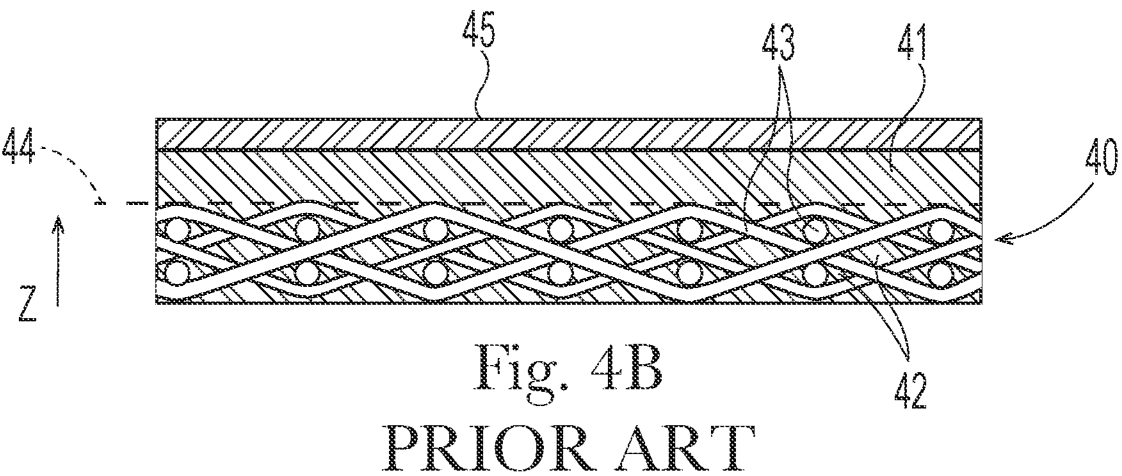
FIG. 4B is a cross-sectional view of an example of a prior art structuring papermaking belt as shown in WO 2021/154292.
Figure 4C:
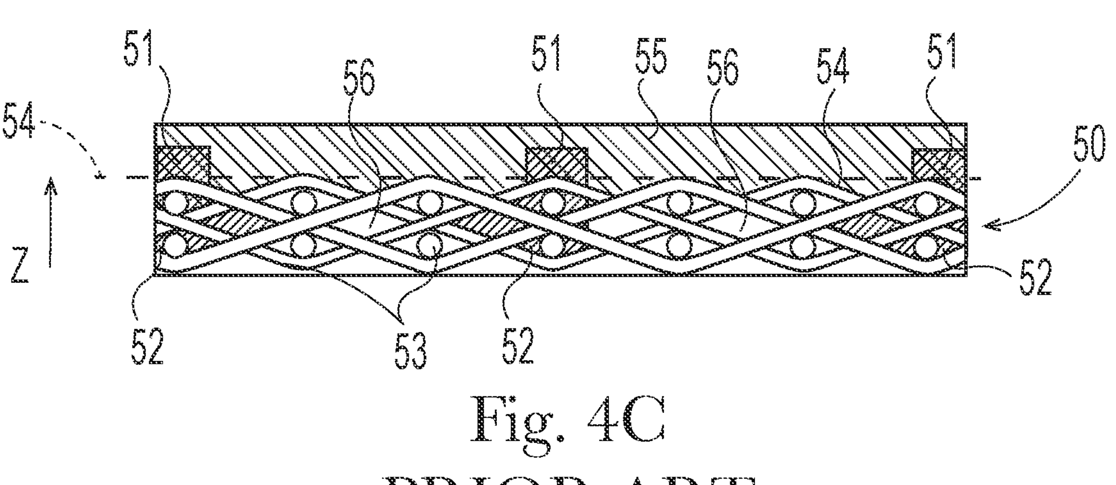
FIG. 4C is a cross-sectional view of an example of a prior art structuring papermaking belt as shown in WO 2021/154292.

"Web material" as used herein means a material comprising at least one planar surface. Web materials are typically flexible and oftentimes relatively thin. Non-limiting examples of web materials include fibrous structures, for example nonwoven fibrous structures, such as wet laid fibrous structures, for example wet laid fibrous structures comprising pulp fibers, such as sanitary tissue products, and/or synthetic polymer nonwovens, for example polyolefin, such as polypropylene and/or polyethylene, and/or polyester meltblown and/or spunbond nonwovens, woven fibrous structures, films, for example polymeric films, and metals.

"Structured web material" as used herein means a web material, for example a fibrous structure, such as a wet laid fibrous structure, for example a sanitary tissue product comprising at least one surface comprising a three-dimensional (3D) pattern, such as a 3D non-random pattern, for example a 3D non-random repeating pattern, where the 3D pattern is imprinted, for example mechanically imprinted, from a web material structuring belt, for example at least the structuring layer of the web material structuring belt, to the web material by rearranging fibrous elements of the web material to permanently relocate such fibrous elements resulting in the structured web material comprising the 3D pattern. The step of imprinting the 3D pattern into the web material may be assisted by a vacuum that helps to one or more portions of the web material into the web material structuring belt. For clarity, merely imparting texture to a surface of a web material without permanently imparting structure into the web material such that a structured web material according to the present invention is formed does not amount to structuring of the web material. In one example, the structured web material, for example the structured fibrous structure, such as the structured wet laid fibrous structure, for example the structured sanitary tissue product of the present invention may comprise one or more common intensive properties that differ in value. In one example, the structured web material of the present invention exhibits one or more common intensive properties that differ in value, for example two or more regions of the structured web material that exhibit different values of a common intensive property, for example density, basis weight, thickness, elevation and/or opacity. In one example, the structured web material of the present invention comprises a surface comprising substantially filled protrusions, which means the protrusions have some mass and thus are not holes or apertures, sometimes referred to as discrete pillows (protrusions), and connecting regions, for example depressions, which may be in the form of a continuous network region, disposed between the protrusions, sometimes referred to as a continuous knuckle (connecting region). In one example, the structured web material of the present invention comprises a surface comprising a substantially filled network protrusion, which means the network protrusion has some mass and thus is not a hole or aperture, sometimes referred to as a continuous pillow (network protrusion) that connects regions, for example discrete depressions, disposed within the network protrusion, sometimes referred to as discrete knuckles (discrete depressions). In another example, the structured web material comprises a surface comprising substantially filled semi-continuous protrusions, which means the semi-continuous protrusions have some mass and thus are not holes or apertures, sometimes referred to as semi-continuous pillows (protrusions), and semi-continuous regions, for example semi-continuous depressions, sometimes referred to as semi-continuous knuckles.

"Common Intensive Property" as used herein means an intensive property possessed by more than one region within a structured web material, for example a structured fibrous structure. Such intensive properties of the structured web material include, without limitation, density, basis weight, thickness, elevation, opacity and combinations thereof. For example, if density is a common intensive property of two or more different regions, a value of the density in one region can differ from a value of the density in one or more other regions. Regions (such as, for example, a first region and a second region and/or a continuous network region and at least one of a plurality of discrete zones) are identifiable areas visually discernible and/or visually distinguishable from one another by distinct intensive properties.

"Differential density", as used herein, means a structured web material, for example a structured fibrous structure, such as a structured wet laid fibrous structure, for example a structured sanitary tissue product that comprises one or more regions of relatively low fibrous element density, which are referred to as pillow regions, and one or more regions of relatively high fibrous element density, which are referred to as knuckle regions.

"Densified", as used herein means a portion of structured web material, for example a structured fibrous structure, such as a structured wet laid fibrous structure, for example a structured sanitary tissue product that is characterized by regions of relatively high fibrous element density (knuckle regions).

"Non-densified", as used herein, means a portion of a structured web material, for example a structured fibrous structure, such as a structured wet laid fibrous structure, for example a structured sanitary tissue product that exhibits a lesser density (one or more regions of relatively lower fibrous element density) (pillow regions) than another portion (for example a knuckle region) of the structured web material, for example a structured fibrous structure, such as the structured wet laid fibrous structure, for example the structured sanitary tissue product.

"Substantially continuous" or "continuous" region refers to an area within which one can connect any two points by an uninterrupted line running entirely within that area throughout the line's length. That is, the substantially continuous region has a substantial "continuity" in all directions parallel to a first plane, for example a surface of a web material and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the structured web material, for example structured fibrous structure as designed and intended.

"Substantially semi-continuous" or "semi-continuous" region refers to an area which has "continuity" in at least one, but not all directions, parallel to a first plane, for example a surface of a web material, and are typically straight lines and/or curvilinear lines in the machine direction or cross-machine direction.

"Discontinuous" or "discrete" regions or zones refer to discrete, and separated from one another areas or zones that are discontinuous in all directions parallel to the first plane.

"Web material structuring belt" is a structural element that is used as a support for a web material and/or web material components during a web material making process, for example during a web material structuring operation within a web material making process, for example a structured web material making process to impart structure, for example a 3D pattern, such as a 3D non-random pattern, for example a 3D non-random repeating pattern to at least one surface of a web material, for example a fibrous structure, such as a wet laid fibrous structure, for example a sanitary tissue product, for example during a structured web material making operation and/or process. As used herein, the web material structuring belt of the present invention comprises at least two distinct layers of materials, for example a support layer and a structuring layer. In one example, the web material structuring belt comprises a pre-formed support layer to which a structuring layer is associated. At least a portion of if not the entirety of the structuring layer may be pre-formed prior to association with the support layer and/or may be formed on the support layer during the association process. In one example, the web material structuring belt comprises a pre-formed structuring layer to which a support layer is associated. At least a portion of if not the entirety of the support layer may be pre-formed prior to association with the structuring layer and/or may be formed on the structuring layer during the association process.

"Layer" as used herein with respect a web material structuring belt, means a distinct, z-direction thickness portion of a web material structuring belt that forms a support layer that is different from another distinct, z-direction thickness portion of the web material structuring belt that forms the structuring layer. In one example, the support layer and structuring layer of a web material structuring belt may be identified as layered according to their function; namely, the support layer exhibits at least a function of supporting the structuring layer and/or the structuring layer exhibits at least a function of imparting texture, for example structure, to a web material during a web material making process when the web material contacts at least the structuring layer of the web material structuring belt. In one example a web material structuring belt of the present invention comprises two or more distinct, visually discernible layers in z-direction thickness cross-section. In one example, layers of a web material structuring belt, for example a support layer and/or structuring layer may be identified based upon timing of making each layer. In one example, layers of a web material structuring belt, for example a support layer and/or structuring layer may be identified based upon timing of making each layer.

"Fibrous structure" as used herein means a structure that comprises a plurality of fibrous elements, for example fibers and/or filaments. In one example, the fibrous structure comprises an orderly arrangement of fibrous elements within a structure in order to perform a function. In one example, the fibrous structure, for example a wet laid fibrous structure comprises a plurality of pulp fibers, for example wood pulp fibers. In another example, the fibrous structure, for example a co-formed fibrous structure comprises a mixture of pulp fibers and filaments, for example a commingled mixture of a plurality of pulp fibers and a plurality of filaments, for example meltblown and/or spunbond filaments. In even another example, the fibrous structure, for example a non-woven meltblown and/or spunbond fibrous structure comprises a plurality of inter-entangled filaments, for example inter-entangled meltblown and/or spunbond filaments, to form a plurality of pulp fibers. In one example, the fibrous structure may comprise a plurality of wood pulp fibers. In another example, the fibrous structure may comprise a plurality of non-wood pulp fibers, for example plant fibers, synthetic staple fibers, and mixtures thereof. In still another example, in addition to pulp fibers, the fibrous structure may comprise a plurality of filaments, such as polymeric filaments, for example thermoplastic filaments such as polyolefin filaments (i.e., polypropylene filaments) and/or hydroxyl polymer filaments, for example polyvinyl alcohol filaments and/or polysaccharide filaments such as starch filaments. Non-limiting examples of fibrous structures of the present invention include paper.

Non-limiting examples of processes for making fibrous structures include known wet-laid papermaking processes, for example through-air-dried papermaking processes, and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire, fabric and/or belt, any of which may be a web material structuring belt according to the present invention, after which drying results in a structured fibrous structure. Further processing the structured fibrous structure may be carried out such that a finished structured fibrous structure is formed. For example, in typical papermaking processes, the finished structured fibrous structure is the structured fibrous structure that is wound on the reel at the end of papermaking, often referred to as a parent roll, and may subsequently be converted into a finished product, e.g. a single- or multi-ply structured sanitary tissue product.

The fibrous structures of the present invention may be homogeneous or may be layered. If layered, the fibrous structures may comprise at least two and/or at least three and/or at least four and/or at least five layers of fibrous elements (fiber and/or filament compositions). "Layer" as used herein with respect a web material, for example a fibrous structure means a distinct, z-direction thickness portion of a fibrous structure that comprises one fibrous element composition, for example hardwood pulp fibers, that is different from another distinct, z-direction thickness portion of the fibrous structure that comprises a different fibrous element composition, for example softwood pulp fibers. Such layered web materials and/or fibrous structures may, in addition to the two or more layers, comprise one or more transition zones between the layers where the fibrous elements of a first layer intermingle with fibrous elements of a second layer. In addition to identifying layers by different fibrous element compositions in the z-direction thickness of web material, for example fibrous structure, a web material may also be identified as layered according to the fibrous element supply, for example if two or more different fibrous element compositions are delivered to a stratified headbox such that the different fibrous element compositions are delivered from different chambers within the stratified headbox such that a layered web material, for example layered fibrous structure is formed.

In one example a layered fibrous structure comprises two or more distinct, visually discernible layers in its z-direction thickness cross-section.

In one example, the fibrous structure of the present invention consists essentially of fibers, for example pulp fibers, such as cellulosic pulp fibers and more particularly wood pulp fibers.

In another example, the fibrous structure of the present invention comprises fibers and is void of filaments.

In still another example, the fibrous structures of the present invention comprises filaments and fibers, such as a co-formed fibrous structure.

"Co-formed fibrous structure" as used herein means that the fibrous structure comprises a mixture of at least two different materials wherein at least one of the materials comprises a filament, such as a polypropylene filament, and at least one other material, different from the first material, comprises a solid additive, such as a fiber and/or a particulate. In one example, a co-formed fibrous structure comprises solid additives, such as fibers, such as wood pulp fibers, and filaments, such as polypropylene filaments.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

The filaments may be made via spinning, for example via meltblowing and/or spunbonding, from a polymer, for example a thermoplastic polymer, such as polyolefin, for example polypropylene and/or polyethylene, and/or polyester. Filaments are typically considered continuous or substantially continuous in nature.

"Meltblowing" is a process for producing filaments directly from polymers or resins using high-velocity air or another appropriate force to attenuate the filaments before collecting the filaments on a collection device, such as a belt, for example a patterned belt or molding member. In a meltblowing process the attenuation force is applied in the form of high speed air as the material (polymer) exits a die or spinnerette.

"Spunbonding" is a process for producing filaments directly from polymers by allowing the polymer to exit a die or spinnerette and drop a predetermined distance under the forces of flow and gravity and then applying a force via high velocity air or another appropriate source to draw and/or attenuate the polymer into a filament.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, glass fibers and polyvinyl alcohol fibers.

Staple fibers may be produced by spinning a filament tow and then cutting the tow into segments of less than 5.08 cm (2 in.) thus producing fibers; namely, staple fibers.

"Pulp fibers" as used herein means fibers that have been derived from vegetative sources, such as plants and/or trees. In one example of the present invention, "pulp fiber" refers to papermaking fibers. In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition, the pulp fibers may be selected from the group consisting of: oak fibers, gum fibers, aspen fibers, and mixtures thereof.

In addition to the various wood pulp fibers, other cellulosic fibers such as non-wood pulp fibers, for example cotton linters, rayon, lyocell, trichomes, seed hairs, rice straw, wheat straw, bamboo, manila hemp (abaca), hesperaloe, agave, cannabis hemp, kapok, milkweed, coconut coir, kenaf, jute, flax, ramie, sisal, esparto, sabai grass, switchgrass, lemon grass and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one example, the outgrowth is a trichome fiber. The outgrowth may be a hairlike or bristlelike outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp. Further trichome fibers are different from monocotyledonous plant derived fibers such as those derived from cereal straws (wheat, rye, barley, oat, etc), stalks (corn, cotton, sorghum, Hesperaloe funifera, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Sanitary tissue product" as used herein means a soft, low density (i.e. <about 0.15 g/cm$^3$) article comprising one or more fibrous structure plies according to the present invention, wherein the sanitary tissue product is useful as a wiping implement for post-urinary and post-bowel movement cleaning (toilet tissue), for otorhinolaryngological discharges (facial tissue), for food consumption related cleaning (paper napkins) and multi-functional absorbent and cleaning uses (absorbent towels). The sanitary tissue product may be convolutedly wound upon itself about a core or without a core to form a sanitary tissue product roll. Alternatively, the sanitary tissue product may be cut and stacked.

The sanitary tissue products and/or fibrous structures of the present invention may exhibit a basis weight of greater than 15 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$. In addition, the sanitary tissue products and/or fibrous structures of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 to 100 g/m$^2$.

The sanitary tissue products of the present invention may exhibit a sum of MD and CD dry tensile strength of greater than about 59 g/cm (150 g/in) and/or from about 78 g/cm to about 394 g/cm and/or from about 98 g/cm to about 335 g/cm. In addition, the sanitary tissue product of the present invention may exhibit a sum of MD and CD dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a sum of MD and CD dry tensile strength of less than about 394 g/cm and/or less than about 335 g/cm.

In another example, the sanitary tissue products of the present invention may exhibit a sum of MD and CD dry tensile strength of greater than about 196 g/cm and/or greater than about 236 g/cm and/or greater than about 276 g/cm and/or greater than about 315 g/cm and/or greater than about 354 g/cm and/or greater than about 394 g/cm and/or from about 315 g/cm to about 1968 g/cm and/or from about 354 g/cm to about 1181 g/cm and/or from about 354 g/cm to about 984 g/cm and/or from about 394 g/cm to about 984 g/cm.

In another example, the sanitary tissue products of the present invention may exhibit a geometric mean dry tensile strength of greater than about 100 g/in and/or greater than about 250 g/in and/or less than about 2500 g/in. Geometric mean dry tensile is calculated by taking the square root of the product of the machine direction (MD) dry tensile and the cross direction (CD) dry tensile of the sanitary tissue product.

In another example, the sanitary tissue products of the present invention may exhibit a cross direction dry tensile strength of greater than about 50 g/in and/or greater than about 100 g/in and/or greater than about 150 g/in and/or less than about 1100 g/in and/or less than about 2500 g/in.

In another example, the sanitary tissue products of the present invention may exhibit a machine direction dry tensile strength of greater than about 200 g/in and/or greater than about 300 g/in and/or less than about 1100 g/in and/or less than about 2500 g/in.

The sanitary tissue products of the present invention may exhibit an initial sum of MD and CD wet tensile strength of less than about 78 g/cm and/or less than about 59 g/cm and/or less than about 39 g/cm and/or less than about 29 g/cm.

In another example, the sanitary tissue products of the present invention may exhibit a cross direction (CD) wet tensile strength of less than about 500 g/in and/or less than about 50 g/in and/or greater than about 3 g/in.

In another example, the sanitary tissue products of the present invention may exhibit a machine direction (MD) wet tensile strength of less than about 650 g/in and/or less than about 100 g/in and/or less than about 80 g/in and/or greater than about 3 g/in.

The sanitary tissue products of the present invention may exhibit an initial sum of MD and CD wet tensile strength of greater than about 118 g/cm and/or greater than about 157 g/cm and/or greater than about 196 g/cm and/or greater than about 236 g/cm and/or greater than about 276 g/cm and/or greater than about 315 g/cm and/or greater than about 354 g/cm and/or greater than about 394 g/cm and/or from about 118 g/cm to about 1968 g/cm and/or from about 157 g/cm to about 1181 g/cm and/or from about 196 g/cm to about 984 g/cm and/or from about 196 g/cm to about 787 g/cm and/or from about 196 g/cm to about 591 g/cm.

The sanitary tissue products of the present invention may exhibit a density of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

The sanitary tissue products of the present invention may exhibit a sheet bulk of greater than about 1.67 g/cm$^3$ and/or greater than about 3.00 g/cm$^3$ and/or greater than about 5.00 g/cm$^3$ and/or greater than about 10.0 g/cm$^3$ and/or greater than about 14.0 g/cm$^3$ and/or greater than about 20.0 g/cm$^3$ and/or from about 5.0 g/cm$^3$ to about 100.0 g/cm$^3$ and/or from about 10.0 g/cm$^3$ to about 50.0 g/cm$^3$.

The sanitary tissue products of the present invention may exhibit an Emtec TS7 value of less than about 33.0 dB V$^2$ rms and/or less than about 20.0 dB V$^2$ rms and/or less than about 18.0 dB V$^2$ rms and/or greater than about 2.0 dB V$^2$ rms and/or greater than about 4.0 dB V$^2$ rms and/or greater than about 5.0 dB V$^2$ rms and/or greater than about 6.0 dB V$^2$ rms and/or greater than about 8.0 dB V$^2$ rms and/or from about 4.5 dB V$^2$ rms to about 7.5 dB V$^2$ rms and/or from about 5.0 dB V$^2$ rms to about 12.0 dB V$^2$ rms and/or from about 8.0 dB V$^2$ rms to about 10.0 dB V$^2$ rms and/or from about 15.0 dB V$^2$ rms to about 19.0 dB V$^2$ rms and/or from about 15.0 dB V$^2$ rms to about 31.0 dB V$^2$ rms as measured according to the Emtec Test Method described herein.

The sanitary tissue products of the present invention may exhibit a Dry Modulus/Tensile of greater than about 1.5 where modulus is measured in units of g/cm and tensile is measured in units of g/in as measured according to the Dry Tensile Test Method described herein. The sanitary tissue products of the present invention may exhibit a CD dry modulus/CD dry tensile of greater than about 2.0 and less than about 10.0 where modulus is measured in units of g/cm and tensile is measured in units of g/in. In addition, the sanitary tissue products may exhibit a MD dry modulus/MD dry tensile of greater than about 1.0 and/or less than about 10.0 where modulus is measured in units of g/cm and tensile is measured in units of g/in. The sanitary tissue products of the present invention may exhibit a GM Modulus/GM tensile, sometimes referred to as Stiffness Index, of greater than about 3.0 and/or greater than about 4.0 and/or less than about 20.0 and/or less than about 12.0 where modulus is measured in units of g/in and tensile is measured in units of g/in.

In one example, any of the fibrous structures of the present invention described herein may be in the form of rolled tissue products (single-ply or multi-ply), for example a dry fibrous structure roll, and may exhibit a roll bulk (in units of cm$^3$/g) of greater than 4 and/or greater than 6 and/or greater than 8 and/or greater than 10 and/or greater than 12 and/or to about 30 and/or to about 18 and/or to about 16 and/or to about 14 and/or from about 4 to about 20 and/or from about 4 to about 12 and/or from about 8 to about 20 and/or from about 12 to about 16.

Additionally, any of the fibrous structures of the present invention described herein may be in the form of a rolled tissue products (single-ply or multi-ply), for example a dry fibrous structure roll, and may have a percent compressibility (in units of %) of less than 10 and/or less than 8 and/or less than 7 and/or less than 6 and/or less than 5 and/or less than 4 and/or less than 3 to about 0 and/or to about 0.5 and/or to about 1 and/or from about 4 to about 10 and/or from about 4 to about 8 and/or from about 4 to about 7 and/or from about 4 to about 6 as measured according to the Percent Compressibility Test Method described herein.

In yet another example of the present invention, a sanitary tissue product roll comprising a web, wherein the sanitary tissue product roll exhibits a Roll Diameter of greater than 3.25 and/or greater than 8.25 inches as measured according to the Roll Diameter Test Method described herein.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

In another example, the sanitary tissue products may be in the form of discrete sheets that are stacked within and dispensed from a container, such as a box.

The fibrous structures and/or sanitary tissue products of the present invention may comprise additives such as surface softening agents, for example silicones, quaternary ammonium compounds, aminosilicones, lotions, and mixtures thereof, temporary wet strength agents, permanent wet strength agents, bulk softening agents, wetting agents, latexes, especially surface-pattern-applied latexes, dry strength agents such as carboxymethylcellulose and starch, and other types of additives suitable for inclusion in and/or on sanitary tissue products.

"Creped" as used herein means the web material, for example structured web material, is creped off of a Yankee dryer or other similar roll, such as a drying cylinder, and/or fabric creped and/or belt creped. Rush transfer of a web material alone does not result in a "creped" fibrous structure or "creped" sanitary tissue product for purposes of the present invention.

"Embossed" as used herein with respect to a web material, such as a structured web material, for example a structured fibrous structure, such as a structured wet laid fibrous structure, for example a structured sanitary tissue product means that a web material, for example a structured web material has been subjected to a process which imparts a decorative pattern, oftentimes referred to as a macro pattern, by replicating a design on one or more emboss rolls, which form a nip through which the web material, for example structured web material passes/travels. Embossed does not include creping, microcreping, printing or other processes, including structuring processes, for example web material structuring operations and/or process that utilize a web material structuring belt according to the present invention, that also impart a texture and/or decorative pattern to a web material. Embossing is a dry deformation process that occurs after the web material his substantially dry, for example less than 10% by weight moisture and/or less than 7% by weight moisture and/or less than 5% by weight moisture and/or less than 3% by weight moisture. Embossing is not structuring and thus does not create a structured web material, for example a structured fibrous structure according to the present invention. One or ordinary skill in the art appreciates that embossing is a converting process that occurs on an already formed, for example a dry web material, such as a dry fibrous structure after the web material making process has formed the web material. In other words, one of ordinary skill in the art understands that embossing is not an operation that occurs during a web material making process, for example a fibrous structure making process, such as a wet laid fibrous structure making process.

"Basis Weight" as used herein is the weight per unit area of a sample reported in lbs/3000 $ft^2$ or $g/m^2$ (gsm) and is measured according to the Basis Weight Test Method described herein.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral web material, such as a structured web material, for example a structured fibrous structure, such as a structured wet laid fibrous structure, for example a structured sanitary tissue product after the web material has been dried, such as after creping off a drying cylinder, for example a Yankee dryer, and/or after the web material is ready for winding/reeling.

"Plies" as used herein means two or more individual, integral web materials, such as structures web materials, for example structured fibrous structures, such as structured wet laid fibrous structures disposed in a substantially contiguous, face-to-face relationship with one another, forming a multi-ply web material, such as a structured multi-ply web material, for example a structured multi-ply fibrous structure, such as a structured multi-ply wet laid fibrous structure, for example a structured multi-ply sanitary tissue product. It is also contemplated that an individual, integral web material can effectively form a multi-ply web material, for example, by being folded on itself.

Web Material Structuring Belt

A web material structuring belt of the present invention may impart texture, for example structure, to a web material depending upon the process used to make the web material. In one example, a web material structuring belt of the present invention can be used to impart structure to a through-air-dried (TAD) wet laid fibrous structure, creped or uncreped. In another example, a web material structuring belt of the present invention can be used to impart structure to a fabric creped and/or belt creped wet laid fibrous structure. In another example, a web material structuring belt of the present invention may be used to impart structure to an NTT wet laid fibrous structure.

In yet another example, a web material structuring belt of the present invention may impart structure to a QRT wet laid fibrous structure. In still another example, a web material structuring belt may impart structure to an ATMOS wet laid fibrous structure. In yet another example, a web material structuring belt can be used on a conventional wet press papermaking machine in a manner to create structure in the conventional wet pressed wet laid fibrous structure and/or to create texture, with or without creating structure, on a surface of the conventional wet pressed wet laid fibrous structure.

In one example, the web material structuring belt imparts texture, for example structure, for example a 3D pattern, for example a 3D non-random pattern, such as a 3D non-random repeating pattern to a web material during a web material making process, for example during a web material structuring operation of a web material making process to form a structured web material. The structuring via the web material structuring belt may occur during a web material forming operation, for example the web material structuring belt may be used in the forming operation of a web material making process and/or during a web material structuring operation of a web material making process. In one example the structuring via the web material structuring belt occurs during the structured web material making process where the web material structuring belt contacts the web material, such as an embryonic web material, such as an embryonic fibrous structure, for example during an operation where components of the web material, for example fibrous elements, such as example fibers within the fibrous structure, for example fibers within the embryonic fibrous structure, are rearranged.

Figures 5A, 5B:
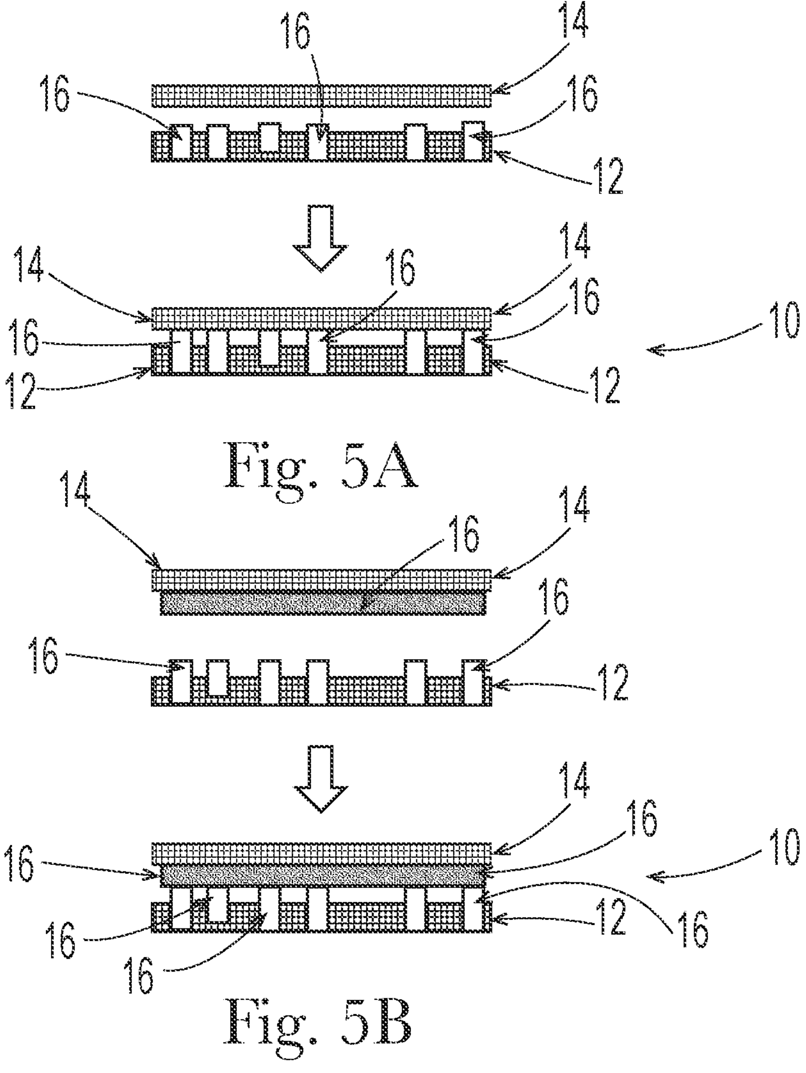
FIG. 5A is a cross-sectional representation of an example of a web material structuring belt according to the present invention.
FIG. 5B is a cross-sectional representation of an example of a web material structuring belt according to the present invention.

As shown in FIGS. 5A and 5B, a web material structuring belt 10 comprising a support layer 12, a structuring layer 14 and an associating layer 16. In one example, at least a portion of an associating layer 16 is associated with the support layer 12 and/or the structuring layer 14 such that the portion of the associating layer 16 extends into but less than entirely through and/or entirely through the support layer 12 and/or the structuring layer 14. In addition to extending into the support layer 12 and/or the structuring layer 14, at least a portion of the associating layer 16 may be co-planar with at least a portion of the support layer 12 and/or the structuring layer 14, in other words, the portion of the associating layer 16 does not extend into the support layer 12 and/or the structuring layer 14.

In one example, as shown in FIG. 5A, at least a portion of the associating layer 16 extends into the support layer 12, for example uniformly or non-uniformly, such as at two or more and/or three or more and/or four or more different distances, for example z-direction thickness distances of the support layer 12. In one example, one or more portions of the associating layer 16 extends into the support layer 12 at a distance less than entirely through the support layer 12 and optionally, at a distance entirely through the support layer 12. In addition to extending into the support layer 12, at least a portion of the associating layer 16 may be co-planar with a portion of the support layer 12 and/or the structuring layer 14, in other words, the portion of the associating layer 16 does not extend into the support layer 12 and/or the structuring layer 14. The support layer 12, the structuring layer 14 and the associating layer 16 are associated together such that one or more void volumes are formed between two or more of the layers. A similar web material structuring belt (not shown) can be formed with the associating layer extending into and/or through the structuring layer and/or where the associating layer extends into and/or through both the support layer and the structuring layer.

As shown in FIG. 5B, in another example, at least a portion of the associating layer 16 extends into the support layer 12, for example uniformly or non-uniformly, such as at two or more and/or three or more and/or four or more different distances, for example z-direction thickness distances of the support layer 12. In one example, one or more portions of the associating layer 16 extends into the support layer 12 at a distance less than entirely through the support layer 12 and optionally, at a distance entirely through the support layer 12. In one example, an associating layer 16 is associated with, and optionally, extends into and/or through the structuring layer 14. The support layer 12, the structuring layer 14 and the associating layer 16 are associated together such that one or more void volumes are formed between two or more of the layers. A similar web material structuring belt (not shown) can be formed with the associating layer extending into and/or through the structuring layer and/or where the associating layer extends into and/or through both the support layer and the structuring layer.

In another example, not shown, the one or more void volumes may be present in a web material structuring belt that is void of an associating layer, in other words, the web material structuring belt comprises a support layer and a structuring layer that are associated with one another such that one or more void volumes are formed between the support layer and the structuring layer.

In one example of the present invention, the associating layer 16 is mechanically entangled with the support layer 12. In another example of the present invention, the associating layer 16 is mechanically entangled with the structuring layer 14. In still another example of the present invention, the associating layer 16 is mechanically entangled with the support layer 12 and the associating layer 16 is mechanically entangled with the structuring layer 14. In one example, mechanically entangled comprises wrapping and/or encircling of one or more components of a layer, such as one or more fibrous elements, for example one or more filaments, by the other layer. In another example, mechanically entangled comprises at least one portion of a layer having a non-linear shape that extends into and locks into place due to its shape and its interaction with the other layer, for example, a hook and loop system.

In one example of the present invention, at least a portion of the associating layer 16 that extends into the support layer 12 is bonded to the support layer 12 at one or more bond sites. In one example, less than the entire amount of the associating layer 16 that extends into the support layer 12 is bonded to the support layer 12 resulting in such bond sites being formed within the support layer 12, which causes such bond sites to be visible within a web material, for example intra-ply, formed on such web material structuring belt 10. In one example, at least one of the one or more bond sites are thermal bond sites. In one example, at least one of the one or more bond sites are chemical bond sites. In one example, at least one of the one or more bond sites are adhesive bond sites. In one example, two or more bond sites are different types of bond sites, for example one of the bond sites is a thermal bond site, chemical bond site or adhesive bond site and the other is a different type of bond site.

The structuring layer and support layer of the web material structuring belt are laminated together, for example by an adhesive, adhesive tape, mechanical fasteners, for example hook and loop, mechanical fastening, heat welding, ultrasonic welding, solvent welding, laser fusion and/or welding, covalent crosslinking between materials of the layers and/or within a layer's material itself, wrapping of components of one layer, for example yarns and/or threads and/or filaments and/or other physical features, such as particles and/or additive manufacturing elements, of one layer, by another layer's material, thermosetting of one layer's material within another layer and/or solidifying of one layer's material within another layer.

Lamination (associating) of the structuring layer and/or support layer to the other layer may include at least a portion of one of the layers exhibiting limited embedment, for example greater than 0 μm and/or greater than 30 μm and/or greater than 40 μm and/or greater than 50 μm and/or greater than 100 μm and/or to less than 5000 μm and/or to less than 4000 μm and/or to less than 3000 μm and/or to less than 2000 μm and/or in yet another example greater than the thickness of at least one yarn, thread and/or filament, for example at least one filament that forms at least a part of a surface of the structuring layer associated with the support layer, for example greater than 50 μm and/or greater than 75 μm and/or greater than 100 μm and/or greater than 150 μm and/or greater than 200 μm and/or greater than 300 μm and/or greater than 400 μm and/or greater than 500 μm and/or greater than 600 μm and/or to less than 5000 μm and/or to less than 4000 μm and/or to less than 3000 μm and/or to less than 2000 μm and/or in even yet another example greater than 5% and/or greater than 10% and/or greater than 20% and/or greater than 30% and/or greater than 40% and/or to less than 95% and/or to less than 90% and/or to less than 80% and/or to less than 70% and/or to less than 60% of the thickness of the structuring layer), but less than entirely through the other layer.

In one example of the present invention, at least a portion of the associating layer 16 that extends into the support layer 12 wraps and/or envelopes (not physically bonds to) a component, for example a fibrous element, such as a filament in the support layer 12. In another example, at least a portion of the associating layer 16 that extends into the structuring layer 14 wraps (not physically bonds to) a component, for example a fibrous element, such as a filament in the structuring layer 14. In another example, at least a portion of the associating layer 16 that extends into the structuring layer 14 wraps (not physically bonds to) a component, for example a physical feature, such as a particle and/or an additive manufacturing element, in the structuring layer 14. In one example, the web material structuring belt of the present invention is an endless belt.

In another example, the web material structuring belt of the present invention is an endless belt comprising a permanent seam and/or is seamless.

In one example of the present invention, the support layer and the structuring layer may be associated with one another by any suitable lamination process. Non-limiting examples of suitable lamination processes according to the present invention include the following.

A structuring layer may be created on a pre-existing support layer by additive manufacturing such that at least portion of the structuring layer penetrates into, but not entirely through the support layer, as described herein, for example by treating the structuring layer and/or treating the support layer as described herein.

A support layer may be created on a pre-existing structuring layer by additive manufacturing such that at least portion of the support layer penetrates into, but not entirely through the structuring layer, as described herein, for example by treating the support layer and/or treating the structuring layer as described herein.

A pre-existing support layer and a pre-existing structuring layer may be combined (brought into contact with one another) and then at least one of the pre-existing support layer and the pre-existing structuring layer is treated, as described herein, such that at least one of the pre-existing support layer and the pre-existing structuring layer such that at least a portion of the pre-existing support layer and the pre-existing structuring layer penetrates into, but not entirely through the other layer(s).

In one example, two or more, for example all three of the support layer, the structuring layer and the associating layer may comprise the same material composition and/or similar classes of materials.

In one example, two or more, for example all three of the support layer, the structuring layer and the associating layer may comprise compatible materials.

In one example, two or more, for example the support layer and the structuring layer may comprise incompatible materials. When the support layer and the structuring layer comprise incompatible materials, the associating layer material may be compatible with one or both of the support layer and the structuring layer.

In one example, two or more, for example all three of the support layer, the structuring layer and the associating layer may comprise the different material compositions and/or different classes of materials.

The web material structuring belts, for example laminated web material structuring belts, of the present invention may exhibit a Peak Peel Force value of greater than 0.1 N and/or greater than 0.3 N and/or greater than 0.5 N and/or greater than 0.8 N to less than 12.0 N and/or to less than 10.0 N and/or to less than 8.0 N and/or to less than 6.0 N and/or to less than 4.0 N as measured according to the 180° Free Peel Test Method described herein.

The web material structuring belts, for example laminated web material structuring belts, of the present invention may exhibit an Energy value of greater than 0.1 J/m and/or greater than 0.3 J/m and/or greater than 0.5 J/m and/or greater than 0.8 J/m and/or to less than 12.0 J/m and/or to less than 10.0 J/m and/or to less than 8.0 J/m and/or to less than 6.0 J/m and/or to less than 4.0 J/m as measured according to the 180° Free Peel Test Method described herein.

Associating Methods

Non-limiting examples of associating methods used in the present invention to associate a support layer and a structuring layer include embedment methods where at least one or more portions of one of the associating layer extends (penetrate) into, but less than entirely through the z-direction thickness of one or both of the support layer and the structuring layer, for example extends into the other layer, for example extends into the other layer greater than 30 μm and/or greater than 40 μm and/or greater than 50 μm and/or greater than 100 μm and/or to less than 5000 μm and/or to less than 4000 μm and/or to less than 3000 μm and/or to less than 2000 μm, in yet another example greater than the thickness of at least one individual component, for example at least one yarn, at least one thread and/or at least one filament, that at least partially defines an upper layer and/or upper surface for example at least one filament that forms at least a part of a surface of the support layer and/or structuring layer associated with the other layer, for example greater than 50 μm and/or greater than 75 μm and/or greater than 100 μm and/or greater than 150 μm and/or greater than 200 μm and/or greater than 300 μm and/or greater than 400 μm and/or greater than 500 μm and/or greater than 600 μm and/or to less than 5000 μm and/or to less than 4000 μm and/or to less than 3000 μm and/or to less than 2000 μm, in even yet another example greater than 5% and/or greater than 10% and/or greater than 20% and/or greater than 30% and/or greater than 40% and/or to less than 95% and/or to less than 90% and/or to less than 80% and/or to less than 70% and/or to less than 60% of the thickness (z-direction thickness) of the support layer and/or structuring layer, in still another example extends past the upper surface and/or upper surface plane of the support layer and/or structuring layer, in another example extends into the support layer and/or structuring layer more than 50% and/or greater than 75% and/or greater than 100% of the thickness of individual components, for example yarns, threads and/or filaments, that define an upper layer and/or an upper surface of the support layer and/or structuring layer, in even yet another example extends into the support layer and/or structuring layer such that at least a portion of the support layer and/or structuring layer envelopes and/or wraps one or more individual components, for example yarns, threads and/or filaments, that define the upper layer and/or upper surface of the other layer, but less than entirely through the other layer.

Association of a structuring layer to a support layer requires sufficient lamination that the resulting web material structuring belt is suitable for running in web material making processes for long periods of time, for example at least 500 and/or at least 750 and/or at least 900 and/or at least 1000 hours. Unexpectedly it has been found that improved lamination is deliverable by improving contacting area between an associating layer and the support layer and/or the structuring layer by causing parts of the associating layer to extend into the support layer and/or the structuring layer. One or more portions or all of the associating layer may comprise a material that is able to penetrate and extend into one or both of the support layer and the structuring layer, for example the material may be capable of being treated such that it softens and/or flows to permit it to penetrate and extend into one or both of the support layer and the structuring layer when subjected to certain conditions (heated, solvated, etc. and allowed to flow or forced to flow, etc.) and/or is pressed into such layers. The portions of the associating layer that extend into the support layer and/or structuring layer may then solidify or be treated (for example by cooling and/or crosslinking and/or curing) to solidify causing the portions to remain in place within the support layer and/or the structuring layer, thus at least mechanically locking in place the associating layer within the support layer and/or the structuring layer such that the structuring layer and support layer are associated according to the present invention. In one example, as long one or more of the portions of the associating layer extends into, but less than entirely through one or both of the support layer and the structuring layer, the resulting web material structuring belt of the present invention is formed. In addition to one or more of the portions of the associating layer extending into, but less than entirely through the support layer and/or the structuring layer, one or more additional portions of the associating layer may not extend into either the support layer or the structuring layer and/or may extend entirely through one or both of the support layer and the structuring layer. In one example, the web material structuring belt comprises portions of an associating layer that extend at different distances into one or both of the support layer and the structuring layer. In one example, this associating method is suitable when the support layer and the structuring layer comprise incompatible materials, but can still be used when the support layer and the structuring layer comprise compatible materials.

In another example of the present invention, an embedment method includes creating and/or forming and/or adding material to a surface of a associating layer such that one or more protrusions are formed on one or more surfaces of the associating layer. The protrusions can then be softened and/or flow and/or pressed into one or both of the support layer and the structuring layer. In one example, one of more surfaces of the associating layer, including portions thereof that extend into the support layer and/or the structuring layer, may be made of material and/or be treated to cause increased friction between the one or more surfaces and one or more surfaces of the support layer and/or the structuring layer, for example such that a friction difference between the one or more surfaces of the associating layer and the support layer and/or structuring layer results.

In yet another example of the present invention, an embedment method includes creating and/or forming and/or adding at least one fibrous element layer, for example at least one filament layer, to one or more surfaces of an associating layer such that the at least one fibrous element layer can be treated such that at least a portion of the at least one fibrous element layer softens and/or flows to permit it to penetrate and extend into the support layer and/or the structuring layer, for example when in contact with the support layer and/or the structuring layer, and when subjected to certain conditions (heated, solvated, etc. and allowed to flow or forced to flow, etc.) and/or is pressed into the support layer and/or the structuring layer. The portions of the associating layer that extend into the support layer and/or the structuring layer may then solidify or be treated (for example by cooling and/or crosslinking and/or curing) to solidify causing the portions of the associating layer to remain in place within the support layer and/or the structuring layer, thus at least mechanically locking in place the associating layer within the support layer and/or the structuring layer such that the structuring layer and support layer are associated according to the present invention. In one example, the associating layer may comprise three or more and/or four or more and/or five or more fibrous element layers. In one example, the associating layer comprises a mono-layer (single layer) of fibrous elements.

In addition to the embedment methods described herein with respect to an associating layer, the associating of a support layer and a structuring layer may further comprise adhesively associating two or more portions of the support layer and structuring layer surfaces to an associating layer. Non-limiting examples of adhesives may be selected from the group consisting of: air activated adhesives, light activated adhesives (both UV and IR), heat activated adhesives, moisture activated adhesives, single part adhesives, multipart adhesives, and combinations thereof. In on example, suitable adhesives include, but are not limited to, adhesives that have low (about 1 to 100 cP at room temperature), medium (101 to 10000 cP at room temperature) and high viscosity (10001 to about 1000000 cP at room temperature) and may exhibit Newtonian or non-Newtonian behavior when deformed prior to curing and may exist as a liquid, gel, paste; epoxies, non-amine epoxy, anhydride-cured epoxy, amine-cured epoxy, high temperature epoxies, modified epoxies, filled epoxies, aluminum filled epoxy, rubber modified epoxies, vinyl epoxies, nitrile epoxy, single and multipart epoxies, phenolics, nitrile phenolics, nitrile phenolic elastomer, nitrile adhesives, modified phenolics, epoxy-phenolics, neoprene phenolics, neoprene phenolic elastomer, second generation acrylics, cyanoacrylates, silicone rubbers, vinyl plastisols, single and multipart polyurethanes, PBI and PI (polyimide) adhesives, acetylenic modified PI, perfluoro-alkylene modified PI, aromatic PI, perfluoro-alkylene modified aromatic PI, epoxy-nylon, polyamides, vinyl-phenolic, polyisocyanates, melamines, melamine formaldehyde, neoprenes, acrylics, modified acrylics, natural rubber (latex), chlorinated natural rubber, reclaimed rubber, styrene-butadiene rubber (SBR), carboxylated styrene butadiene copolymer, styrene butadiene, butadiene-acrylonitrile sulfide, silicone rubber, bitumen, soluble silicates, polyphenylquinoxaline, (solvent adhesive) hexafluoroacetone sesquihydrate (structural adhesive) thermosets: epoxy, polyester with isocyanate curing, styrene-unsaturated polyester, unsaturated polyesters, polyester-polyisocyanates, cyanoacrylate (non-structural adhesive) one component: thermoplastic resins, rubbers, synthetic rubber, phenolic resin and/or elastomers dispersed in solvents; room temperature curing based on thermoplastic resins, rubbers, synthetic rubber, SBR (styrene phenolic resin and/or elastomers dispersed in solvents; elastomeric adhesives, neoprene (polychloroprene) rubber, rubber based adhesives, resorcinol, ethylene vinyl acetate, polyurethane, polyurethane elastomer, polyurethane rubber (bodied solvent cements) epoxies, urethanes, second generation acrylics, vinyls, nitrile-phenolics, solvent type nitrile-phenolic, cyanoacrylates, Polyvinyl acetate, poly acrylate (carboxylic), phenoxy, resorcinol-formaldehyde, urea-formaldehyde, Polyisobutylene rubber, polyisobutyl rubber, polyisobutylene, butyl rubber, nitrile rubber, nitrile rubber phenolic, modified acrylics, cellulose nitrate in solution (household cement), synthetic rubber, thermoplastic resin combined with thermosetting resin, Nylon-phenolic, vulcanizing silicones, room-temperature vulcanizing silicones, hot melts, polyamide hot melts, Epoxy-polyamide, polyamide, epoxy-polysulfide, polysulfides, silicone sealant, silicone elastomers, Anaerobic adhesive, vinyl acetate/vinyl chloride solution adhesives, PMMA, pressure sensitive adhesives, polyphenylene sulfide, Phenolic polyvinyl butyral, furans, furane, phenol-formaldehyde, polyvinyl formal-phenolic, polyvinyl butyral, butadiene nitrile rubber, resorcinol-polyvinyl butyral, urethane elastomers, PVC, polycarbonate copolymer, polycarbonate copolymer with resorcinol, siloxane and/or bisphenol-A, and flexible epoxy-polyamides. Other possible adhesives include natural adhesives such as casein, natural rubber, latex and gels from fish skins, and adhesives that provide temporary adhesion such as water soluble glues (e.g., Elmer's® glue and Elmer's® glue stick).

In one example, one or more of the support layer and/or structuring layer and/or associating layer may be pre-treated prior to associating. Non-limiting examples of pre-treating include pre-treating a surface of the layer with adhesive and/or solvent. In one example, the pre-treating includes applying primers to a surface, subjecting a surface to corona/plasma treatments, swelling a surface, subjecting a surface to heat and/or flame, smoothing a surface, subjecting a surface to UV radiation and/or IR radiation and/or microwave radiation, and sanding and/or roughening a surface.

In one example, an auxiliary bonding technique, for example melt bonding and auxiliary bonding, for example laser and/or IR, solvent welding, and/or using an energy absorbing material may help bonding between the support layer and the structuring layer.

Even though the present invention is directed to associating a support layer and a structuring layer by having an associating layer penetrate and extend into one or both of the support layer and the structuring layer as described herein to form a web material structuring belt according to the present invention, other associating methods such as bonding, for example mechanical, chemical and/or adhesive bonding, and/or use of connecting threads and/or yarns and/or filaments to "tie" the support layer, structuring layer and associating layer together at one or more sites may be present in the web material structuring belts of the present invention.

In one example, the support layer may comprise an additional material, for example an air perm controlling material, which is different from the support layer material, that provides can be present in and/or on the support layer in one or more x-y regions and/or z-regions to impact the support layer's air perm.

In another example, one or more open areas (such as gaps and/or voids) between the associated structuring layer and support layer may be present in the web material structuring belt. For example, the open areas may provide air perm benefits and/or air leakage and/or drying benefits as a result of the air passing through the web material structuring belt.

In addition to portions of the associating layer extending into, but less than entirely through the thickness (z-direction thickness) of the support layer and/or the structuring layer, as described herein one or more of the support layer and/or the structuring layer may comprise portions that extend into the associating layer, for example into, but less than entirely through the associating layer.

Support Layer

A support layer of the web material structuring belt may be any suitable material. In one example, the support layer may comprise a woven material. In another example, the support layer may comprise a nonwoven material. In still another example, the support layer may comprise a film, for example an apertured film and/or porous film and/or laser-abraded film and/or laser-etched film and/or perforated film, In yet another example, the support layer may comprise a wire, for example a wire mesh and/or a wire screen, such as a metallic wire mesh and/or metallic wire screen and/or plastic wire mesh and/or plastic wire screen. In still another example, the support layer comprises paper, for example carton board and/or cardboard. In one example, the support layer is an additive manufacturing support layer, for example a fused deposition modeling (FDM) support layer or a selective laser sintering (SLS) support layer. In another example, the support layer and/or the structuring layer may comprise components, for example additive manufactured elements, for example segments made from additive manufacturing, for example fused deposition modeling (FDM) and/or stereolithography (SLA).

When the support layer is a woven material, the support layer may comprise woven threads and/or woven yarns and/or woven yarn arrays. The woven material support layer may comprise one or more polymers, such as a polymer resin, for example one or more polymer filaments, such as thermoplastic polymers and/or non-thermoplastic polymers and/or thermoset polymers, biodegradable polymers and/or compostable polymers and/or non-biodegradable polymer. In one example, the filaments of the woven material support layer comprises polymer filaments, such as polyolefin filaments, for example polypropylene filaments and/or polyethylene filaments, polyester filaments, such as polyethyleneterephthalate filaments, copolyester filaments, polyamide filaments, such as nylon filaments, copolyamide filaments, polyphenylene sulfide filaments, polyether ether ketone filaments, polyurethane filaments, polylactic acid filaments, polyhydroxyalkanoate filaments, polycaprolactone filaments, polyesteramide filaments and mixtures thereof. The woven material support layer may comprise a single layer or multi-layers. The filaments in the woven material support layer may be monocomponent filaments and/or multi-component filaments, such as bicomponent filaments.

When the support layer is a nonwoven material, the support layer may comprise nonwoven threads and/or nonwoven yarns and/or nonwoven yarn arrays. The nonwoven material support layer may comprise one or more polymers, such as a polymer resin, for example one or more polymer filaments, such as thermoplastic polymers and/or non-thermoplastic polymers and/or thermoset polymers, biodegradable polymers and/or compostable polymers and/or non-biodegradable polymer. In one example, the filaments of the nonwoven material support layer comprises polymer filaments, such as polyolefin filaments, for example polypropylene filaments and/or polyethylene filaments, polyester filaments, such as polyethyleneterephthalate filaments, copolyester filaments, polyamide filaments, such as nylon filaments, copolyamide filaments, polyphenylene sulfide filaments, polyether ether ketone filaments, polyurethane filaments, polylactic acid filaments, polyhydroxyalkanoate filaments, polycaprolactone filaments, polyesteramide filaments and mixtures thereof. The nonwoven material support layer may comprise a single layer or multi-layers. The filaments in the nonwoven material support layer may be monocomponent filaments and/or multi-component filaments, such as bicomponent filaments.

In one example, one or more surfaces of the support layer, for example the surface of the support layer that contacts the structuring layer, may be sanded and/or abraded to increase the surface area of the surface of the support layer and thus increase the potential contact between support layer and the structuring layer of the web material structuring belt.

In one example, the support layer exhibits an air perm of greater than 400 scfm and/or greater than 500 scfm and/or greater than 600 scfm and/or greater than 700 scfm and/or greater than 800 scfm and/or to about 1500 scfm and/or to about 1400 scfm and/or to about 1300 scfm and/or to about 1200 scfm and/or to about 1100 scfm and/or to about 1000 scfm.

In one example, the support layer is a non-batted support layer, for example a non-felt support layer.

In one example, the support layer comprises two or more layers of fibrous elements, for example two or more layers of yarns, threads and/or filaments, such as two or more layers of filaments.

In one example, the support layer of the present invention is an endless material. In another example, the support layer of the present invention is an endless material comprising a permanent seam.

In one example, the support layer at least partially functions to provide integrity, stability, and/or durability of the structuring layer.

In one example, the support layer comprises an at least partially or wholly fluid-permeable.

In one example, the support layer is a woven fibrous structure, for example a woven fibrous structure comprising a plurality of yarns, threads, and/or fibrous elements, for example filaments, and may comprise any suitable weave pattern, including, but not limited to Jacquard-type.

The materials used to form the support layer may be any one of those well known in the art such as, for example, polymers, such as polyethylene terephthalate ("PET"), polyamide ("PA"), polyethylene ("PE"), polypropylene ("PP"), polyphenylene sulfide ("PPS"), polyether ether ketone ("PEEK"), polyethylene naphthalate ("PEN"), or a combination thereof. When the support layer is a woven fabric, it can comprise monofilament, multifilament, and plied multifilament yarns. More broadly, however, the base substrate may be a woven, nonwoven or knitted fabric comprising yarns of any of the varieties used in the production of paper machine clothing or of belts used to manufacture nonwoven articles and fabrics. These yarns may be obtained by extrusion from any of the polymeric resin materials used for this purpose by those of ordinary skill in the art. Accordingly, resins from the families of polyamide, polyester, polyurethane, polyaramid, polyolefin and other resins may be used. (U.S. Pat. No. 7,014,735B2, NTT belts)

A support layer of the present disclosure may comprise one or more materials selected from the group consisting of woven, Spun or Bonded filaments; composed of natural and/or synthetic fibers; metallic fibers, carbon fibers, silicon carbide fibers, fiberglass, mineral fibers, and] or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamids (aramids) such as Twaron®, Kevlar® and Nomex®; polytetrafluoroethylene such as Teflon® commercially available from DuPont®; polyethylene (PE), including with extremely long chains HMPE (e.g. Dyneema or Spectra); polyphenylene sulfide ("PPS"); and] or elastomers. In one non-limiting form, the woven filaments of reinforcing member are filaments as disclosed in U.S. Pat. No. 9,453,303 issued Sep. 27, 2016 in the name of Aberg et. al. and described by Brent, Jr. et. al., 2018 in U.S. Application 2018/0119347.

In one example, the support layers may comprise a woven and/or nonwoven material (i.e., base fabric)—such as woven yarns, nonwovens, yarn arrays, spiral links, knits, braids; spiral wound strips of any of above-listed forms, independent rings, and other extruded element forms. For example, the support layer can be made from polymers such as polyethylene terephthalate ("PET"), polyamide ("PA"), polyethylene ("PE"), polypropylene ("PP"), polyphenylene sulfide ("PPS"), polyether ether ketone ("PEEK"), polyethylene naphthalate ("PEN"), metal, or a combination of polymers and metal.

In one example, the support layer may comprise polymeric materials, which may be applied either by piezojet array or by bulk-jet array, and may include polymeric materials in the following four classes: 1) hot melts and moisture-cured hot melts; 2) two-part reactive systems based on urethanes and epoxies; 3) photopolymer compositions consisting of reactive acrylated monomers and acrylated oligomers derived from urethanes, polyesters, polyethers, and silicones; and 4) aqueous-based latexes and dispersions and particle-filled formulations including acrylics and polyurethanes.

The support layer may be made using an additive manufacturing process that lays down successive layers or zones of material. Each layer has a thickness within the range of 1 to 1000 microns, and preferably within the range of 7 to 200 microns. The materials used in each layer may be composed of polymers with a Young's Modulus within the range of 10 to 500 MPa, and preferably 40 to 95 MPa. Such polymers may include nylons, aramids, polyesters such as polyethylene terephthalate or polybutyrate, or combinations thereof.

In another example, the support layer may be made by an additive manufacturing approach such as by stereolithography (SLA), continuous liquid interface production (CLIP), large area maskless photopolymerization (LAMP), high area rapid printing (HARP), selective deposition, or jetting. These approaches utilize a photopolymer resin. The photopolymer resin(s) applicable to these additive manufacturing methods may include cross-linkable polymers selected from light activated polymers (e.g., UV light activated, e-beam activated, etc.). The photopolymer resins may be blended with other resins (e.g. epoxy or epoxies) to have hybrid curing systems similarly described in UV- and thermal curing behaviors of dual-curable adhesives based on epoxy acrylate oligomers by Y. J. Park et. al. in Int. J. Adhesion & Adhesives 2009 710-717. The photopolymer resin may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al., described in WO Publication No. 2015/183719 A1 filed on May 22, 2015 in the name of Herlihy et al., and/or described in WO Publication No. 2015/183782 A1 filed on May 26, 2015 in the name of Ha et al., and/or described in US Publication No. 2019/0160733 filed May 31, 2017 in the name of Mirkin et al. Other suitable cross-linkable and filler materials known in the art may also be employed as the photopolymer resin as described in US Publication No. 2015/0160733 filed on May 31, 2017 in the name of Mirkin et al, and/or as described in U.S. Pat. No. 10,245,785 issued Apr. 2, 2019 in the name of Adzima. The photopolymer resin may be comprised of monomers as described in US20200378067 etc.

In another example, the support layer may be made using a casting process as described in U.S. Pat. No. 4,514,345 issued Apr. 30, 1985 in the name of Johnson et al. This process creates a film of photopolymer resin which is then cured with radiation to form a support layer. The photopolymer resin used in this process may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al.

Structuring Layer

A structuring layer of the web material structuring belt may be any suitable material. In one example, the structuring layer may comprise a woven material. In another example, the structuring layer may comprise a nonwoven material. In still another example, the structuring layer may comprise a film, for example an apertured film and/or porous film and/or laser-abraded film and/or laser-etched film and/or perforated film, In yet another example, the structuring layer may comprise a wire, for example a wire mesh and/or a wire screen, such as a metallic wire mesh and/or metallic wire screen and/or plastic wire mesh and/or plastic wire screen. In still another example, the structuring layer comprises paper, for example carton board and/or cardboard. In one example, the structuring layer is an additive manufacturing structuring layer, for example a fused deposition modeling (FDM) structuring layer or a selective laser sintering (SLS) structuring layer. In yet another example, the structuring layer comprises a foam, for example an open-celled foam.

When the structuring layer is a woven material, the structuring layer may comprise woven threads and/or woven yarns and/or woven yarn arrays. The woven material structuring layer may comprise one or more polymers, for example one or more polymer filaments, such as thermoplastic polymers and/or non-thermoplastic polymers and/or thermoset polymers, biodegradable polymers and/or compostable polymers and/or non-biodegradable polymer. In one example, the filaments of the woven material structuring layer comprises polymer filaments, such as polyolefin filaments, for example polypropylene filaments and/or polyethylene filaments, polyester filaments, such as polyethylene-terephthalate filaments, copolyester filaments, polyamide filaments, such as nylon filaments, copolyamide filaments, polyphenylene sulfide filaments, polyether ether ketone filaments, polyurethane filaments, polylactic acid filaments, polyhydroxyalkanoate filaments, polycaprolactone filaments, polyesteramide filaments and mixtures thereof. The woven material structuring layer may comprise a single layer or multi-layers. The filaments in the woven material structuring layer may be monocomponent filaments and/or multi-component filaments, such as bicomponent filaments.

When the structuring layer is a nonwoven material, the structuring layer may comprise nonwoven threads and/or nonwoven yarns and/or nonwoven yarn arrays. The nonwoven material structuring layer may comprise one or more polymers, for example one or more polymer filaments, such as thermoplastic polymers and/or non-thermoplastic polymers and/or thermoset polymers, biodegradable polymers and/or compostable polymers and/or non-biodegradable polymer. In one example, the filaments of the nonwoven material structuring layer comprises polymer filaments, such as polyolefin filaments, for example polypropylene filaments and/or polyethylene filaments, polyester filaments, such as polyethyleneterephthalate filaments, copolyester filaments, polyamide filaments, such as nylon filaments, copolyamide filaments, polyphenylene sulfide filaments, polyether ether ketone filaments, polyurethane filaments, polylactic acid filaments, polyhydroxyalkanoate filaments, polycaprolactone filaments, polyesteramide filaments and mixtures thereof. The nonwoven material structuring layer may comprise a single layer or multi-layers. The filaments in the nonwoven material structuring layer may be monocomponent filaments and/or multi-component filaments, such as bicomponent filaments.

In one example, one or more surfaces of the structuring layer, for example the surface of the structuring layer that contacts the structuring layer, may be sanded and/or abraded to increase the surface area of the surface of the structuring layer and thus increase the potential contact between structuring layer and the structuring layer of the web material structuring belt.

In one example, the structuring layer exhibits an air perm of greater than 400 scfm and/or greater than 500 scfm and/or greater than 600 scfm and/or greater than 700 scfm and/or greater than 800 scfm and/or to about 1500 scfm and/or to about 1400 scfm and/or to about 1300 scfm and/or to about 1200 scfm and/or to about 1100 scfm and/or to about 1000 scfm.

In one example, the structuring layer is a non-batted structuring layer, for example a non-felt structuring layer.

In one example, the structuring layer may comprise a material, for example a thermoplastic resin and/or silicone rubber and/or non-silicone vulvanized rubber and/or film and/or woven material and/or nonwoven material.

In one example, the structuring layer may comprise an epoxy.

When the structuring layer comprises a thermoplastic resin, the thermoplastic resin may be selected from the group consisting of: polyvinyl fluoride, polyvinylidene fluoride, polyvinyl chloride, polyethylene, polypropylene, polyethers, styrene-butadiene copolymers, polybutylenes, and the like. When the structuring layer comprises a film, for example a thermoplastic polymer film, for example a thermoplastic polymer film comprising a thermoplastic polymer selected from the group consisting of: polyethylene ("PE"), polypropylene ("PP"), polyphenylene sulfide ("PPS"), polyimides, polyamides, polysulfones, polysulfides, cellulosic resins, polyarylate acrylics, polyarylsulfones, polyurethanes, epoxies, poly(amide-imides), copolyesters, polyethersulfones, polyetherimides, polyarylethers, and the like.

In one example, the structuring layer may comprise a silicone rubber.

In another example, the structuring layer may comprise a fluoroelastomer layer bonded to a silicone rubber layer.

In one example, the structuring layer comprises a thermoset polymer and/or UV light curable polymer.

In one example, the structuring layer comprises a thermoplastic polymer, for example a thermoplastic elastomer, such as rubber materials.

In one example, the structuring layer comprises a plurality of filaments and/or a plurality of fibers, such as polymeric fibers, for example staple fibers.

In one example, the structuring layer may be made by any suitable technique, for example, molding and/or extruding and/or thermoforming. In one example, the structuring layer comprises distinct portions or components that are joined together to form the structuring layer.

In one example, the structuring layer comprises a pattern, for example a 3D pattern, such as a non-random 3D pattern, for example a non-random repeating 3D pattern, that imparts texture, for example a pattern, such as a 3D pattern to a surface of a web material formed on the web material structuring belt according to the present invention.

In one example, the structuring layer of the present invention is an endless material. In another example, the structuring layer of the present invention is an endless material comprising a permanent seam.

In one example, the structuring layer is mechanically entangled with the support layer.

In one example, at least a portion of the structuring layer that extends into the support layer is bonded to the support layer at one or more bond sites, for example wherein less than the entire amount of the structuring layer that extends into the support layer is bonded to the support layer. Non-limiting example of suitable bond sites include thermal bond sites, chemical bond sites, adhesive bond sites and mixtures thereof.

The structuring layer may be formed from a (non-thermoplastic) material selected from one of polyethylene terephthalate (PET), polyethylene-naphthalate (PEN), polyetheretherketone (PEEK), polyamide (PA), polyphenylene sulfide (PPS), cyanate esters, isocyanate, benzoxazine, polyimide, bismaleimide, phthalonitrile resin (PN), bismaleimide-triazine (BT), epoxy, silicone resins, epoxy-cyanate, polyolefins, and mixtures thereof.

The structuring layer may comprise a thermoplastic polymer. Suitable thermoplastic polymer which can be employed include, but are not limited to, polyvinyl fluoride, polyvinylidene fluoride, polyvinyl chloride, polyethylene, polypropylene, polyethers, styrene-butadiene copolymers, polybutylenes, polyethylene ("PE"), polypropylene ("PP"), polyphenylene sulfide ("PPS"), polyimides, polyamides, polysulfones, polysulfides, cellulosic resins, polyarylate acrylics, polyarylsulfones, polyurethanes, epoxies, poly (amide-imides), copolyesters, polyethersulfones, polyetherimides, polyarylethers, and the like.

In one example, the structuring layer may comprise polymeric materials, which may be applied either by piezo-jet array or by bulk-jet array, and may include polymeric materials in the following four classes: 1) hot melts and moisture-cured hot melts; 2) two-part reactive systems based on urethanes and epoxies; 3) photopolymer compositions consisting of reactive acrylated monomers and acrylated oligomers derived from urethanes, polyesters, polyethers, and silicones; and 4) aqueous-based latexes and dispersions and particle-filled formulations including acrylics and polyurethanes.

The structuring layer may comprise a silicone rubber, or a non-silicone vulcanized rubber made from at least a majority by weight of fluoroelastomer having good heat and chemical resistance. In other instances, the nonwoven layer may comprise a silicone rubber. In still other instances the nonwoven may comprise a fluoroelastomer layer bonded to a silicone rubber layer. The structuring layer is formed from a material having tear strengths ranging from about 10 to about 50 N/mm with hardness ranging from about 20 to about 75 on the Shore A scale. In other instances, it may be preferable that the structuring layer is formed from a material having a Young's Modulus greater than about 0.5 Mpa, such as from about 0.5 to about 6.0 MPa, such as from about 1.0 to about 4.0 MPa. For example, in one example, the structuring layer may comprise a structuring layer material having a hardness from about 50 to about 70 on the Shore A scale and a modulus from about 2.0 to about 5.0 MPa.

In one example, the structuring layer is made using an additive manufacturing process that lays down successive layers or zones of material. Each layer has a thickness within the range of 1 to 1000 microns, and preferably within the range of 7 to 200 microns. The materials used in each layer may be composed of polymers with a Young's Modulus within the range of 10 to 500 MPa, and preferably 40 to 95 MPa. Such polymers may include nylons, aramids, polyesters such as polyethylene terephthalate or polybutyrate, or combinations thereof.

In another example, the structuring layer may be made by an additive manufacturing approach such as by stereolithography (SLA), continuous liquid interface production (CLIP), large area maskless photopolymerization (LAMP), high area rapid printing (HARP), selective deposition, or jetting. These approaches utilize a photopolymer resin. The photopolymer resin(s) applicable to these additive manufacturing methods may include cross-linkable polymers selected from light activated polymers (e.g., UV light activated, e-beam activated, etc.). The photopolymer resins may be blended with other resins (e.g. epoxy or epoxies) to have hybrid curing systems similarly described in UV- and thermal curing behaviors of dual-curable adhesives based on epoxy acrylate oligomers by Y. J. Park et. al. in Int. J. Adhesion & Adhesives 2009 710-717. The photopolymer resin may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al., described in WO Publication No. 2015/183719 A1 filed on May 22, 2015 in the name of Herlihy et al., and/or described in WO Publication No. 2015/183782 A1 filed on May 26, 2015 in the name of Ha et al., and/or described in US Publication No. 2019/0160733 filed May 31, 2017 in the name of Mirkin et al. Other suitable cross-linkable and filler materials known in the art may also be employed as the photopolymer resin as described in US Publication No. 2015/0160733 filed on May 31, 2017 in the name of Mirkin et al, and/or as described in U.S. Pat. No. 10,245,785 issued Apr. 2, 2019 in the name of Adzima. The photopolymer resin may be comprised of monomers as described in US20200378067 etc.

In another example, the structuring layer may be made using a casting process as described in U.S. Pat. No. 4,514,345 issued Apr. 30, 1985 in the name of Johnson et al. This process creates a film of photopolymer resin which is then cured with radiation to form a structuring layer. The photopolymer resin used in this process may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al.

Any suitable polymerizable liquid can be used to enable the present invention. The liquid (sometimes also referred to as "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A. (taken from U.S. Ser. No. 10/144,181B2, which includes some acid catalyzed polymers, silicone resins, biodegradable resins, etc. which could also work. It also includes a bunch of cited literature). Carbon 3D also lists materials in U.S. Ser. No. 10/647,873B2, U.S. Ser. No. 10/596,755B2, U.S. Ser. No. 11/141,910B2.

Alternatively, the polymeric resin material may be deposited onto or within the base substrate by spraying, jetting, blade coating, single-pass-spiral (SPS) coating, multiple-thin-pass (MTP) coating, or any other methods known in the art to apply a liquid material to a textile substrate.

In one example, the structuring layer is present in the web material structuring belt in the form a pattern, for example a 3D pattern, such as a non-random 3D pattern, for example a non-random repeating 3D pattern, that contacts a web material upon making and/or structuring of the web material on the web material structuring belt. The structuring layer's pattern may comprise continuous, substantially continuous, semi-continuous, and/or discrete knuckles that imprint knuckle regions into a web material structured on the web material structuring belt. The structuring layer's pattern may comprise continuous, substantially continuous, semi-continuous and/or discrete deflection conduits within the structuring layer that imprint pillow regions into a web material structured on the web material structuring belt as the fibrous elements of the web material deflect into the deflection conduits during the web material making and/or structuring process.

Additive Manufacturing Materials

As described herein, the support layer and/or structuring layer of the web material structuring belt of the present invention may comprise additive manufacturing materials. The additive manufacturing materials may be any known additive manufacturing materials suitable for the web material structuring belts and processes for making such web material structuring belts and/or processes for using web material structuring belts of the present invention. Non-limiting examples of suitable additive manufacturing materials include digital alloys, such as polyurethanes and/or acrylics, that may provide strength, flexibility, chemical resistance, and/or abrasion resistance.

In one example, the additive manufacturing materials may comprise thermoplastic materials selected from the group consisting of: polylactic acid (PLA), acrylonitrile butadiene styrene (ABS), polyether ether ketone (PEEK), polyaryletherketone (PAEK), polytetrafluoroethylene (PTFE), polyurethane (PU) (NinjaFlex), Nylon, or any other suitable thermoplastic material. In one example, the additive manufacturing materials may comprise composite print materials include both thermoplastic materials and fillers, for example (soft or hard) wood filled thermoplastics, (copper, bronze, stainless steel) metal filled thermoplastics and any other suitable filler materials.

In certain examples the polymeric material used in the additive manufacturing process may comprise PET (polyester), PPS (polyphenylene sulphide), PCTA (poly 1,4 cyclohexane dimethylene terephthalate), PEN (polyethylene naphthalate), PVDF (polyvinylidene fluoride) or PEEK (polyetheretherketone), either alone or in combination. Generally, such materials are capable of withstanding temperatures found in the papermaking process (up to or above 500° F.) in the presence of air and water vapor.

In other examples the polymeric material used in the additive manufacturing process comprises thermoplastics such as, for example, a thermoplastic comprising from about 0.5 and 10 weight percent silicone and a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS.

In one example, the additive manufacturing materials may comprise polymeric materials, which may be applied either by piezojet array or by bulk-jet array, and may include polymeric materials in the following four classes: 1) hot melts and moisture-cured hot melts; 2) two-part reactive systems based on urethanes and epoxies; 3) photopolymer compositions consisting of reactive acrylated monomers and acrylated oligomers derived from urethanes, polyesters, polyethers, and silicones; and 4) aqueous-based latexes and dispersions and particle-filled formulations including acrylics and polyurethanes.

Any suitable polymerizable liquid can be used with CLIP to form the belt. Preferred polymerizable materials can include those sufficient of withstanding high temperatures and humid environments in which the papermaking belt may be employed in manufacturing of tissue webs. Polymerizable materials can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof.

In certain instances the polymerizable material may include solid particles suspended or dispersed therein. Any suitable solid particle can be used, depending upon the end product being fabricated. The particles can be metallic, organic/polymeric, inorganic, or composites or mixtures thereof. In certain examples the polymerizable materials may include a semi-conductive, or conductive material, such as a conductive metal, to improve or facilitate heat transfer.

In still other examples the materials may comprise a polymeric material having a viscosity greater than 70,000 Centipoise (cP) and preferably in a range from about 100,000 to about 150,000 cP, measured according to ASTM D790-10 at 120° C. In certain preferred examples the polymer material comprises at least one of a polyurethane, a silicone, or a polyureas and has a viscosity from about 120,000 to about 140,000 cP.

If additive manufacturing is used to make one or both of the support layer and structuring layer, non-limiting examples of additive manufacturing processes that may be used are described below and/or may be selected from the group consisting of: continuous liquid interphase printing (CLIP), fused deposition modeling (FDM), electron-beam freeform fabrication (EBF3), direct metal laser sintering (DMLS), electron-beam melting (EBM), selective laser sintering (SLS), selective heat sintering (SHS), laminated object manufacturing (LOM), stereolithography (SLA), digital light processing (DLP), multi-jet modeling (MJM) and mixtures thereof.

With additive manufacturing, a 3D structure of a substrate or portion of a substrate, for example support layer or structuring layer, is digitized via computer-aided solid modeling or the like. The coordinates defining the substrate are then transferred to a device that uses the digitized data to build the substrate. Typically, a processor subdivides the substrate into thin slices or layers. Based on these subdivisions, the printer or other application device then applies thin layers of material sequentially to build the three-dimensional configuration of the substrate. Some methods melt or soften material to produce the layers, while others cure liquid materials using different methods.

One such technique is multi-jet modeling (MJM). With this technique, multiple printer heads apply layers of structural material to form the substrate. Often, layers of a support material are also applied in areas where no material is present to serve as a support layer. The structural material is cured, then the support material is removed. As an example, the structural material may comprise a curable polymeric resin, and the support material may comprise a paraffin wax that can be easily melted and removed.

Another such technique is fused deposition modeling (FDM). This technique also works on an "additive" principle by laying down material in layers. A plastic filament or metal wire is unwound from a coil and supplies material to an extrusion nozzle which can turn the flow on and off. The nozzle is heated to melt the material and can be moved in both horizontal and vertical directions by a numerically controlled mechanism, directly controlled by a computer-aided manufacturing (CAM) software package. The model or part is produced by extruding small beads of thermoplastic material, such as ABS, polycarbonate, and the like, to form layers; typically, the material hardens immediately after extrusion from the nozzle, such that no support layer is employed.

Still another class of alternative technique involves the use of a selective laser, which can either be selective laser sintering (SLS) or selective laser melting (SLM). Like other methods of additive manufacturing, an object formed with an SLS/SLM machine starts as a computer-aided design (CAD) file. CAD files are converted to a data format (e.g., an .stl format), which can be understood by an additive manufacturing apparatus. A powder material, most commonly a polymeric material such as nylon, is dispersed in a thin layer on top of the build platform inside an SLS machine. A laser directed by the CAD data pulses down on the platform, tracing a cross-section of the object onto the powder. The laser heats the powder either to just below its boiling point (sintering) or above its melting point (melting), which fuses the particles in the powder together into a solid form. Once the initial layer is formed, the platform of the SLS machine drops—usually by less than 0.1 mm—exposing a new layer of powder for the laser to trace and fuse together. This process continues again and again until the entire object has been formed. When the object is fully formed, it is left to cool in the machine before being removed.

Still other techniques of additive manufacturing processes include stereolithography (which employs light-curable material and a precise light source) and laminated object manufacturing.

The web material structuring belts of the present invention may be manufactured using any suitable additive manufacturing technique, for example Fused Deposition Modeling™ (commonly known as fused filament fabrication) and PolyJet Technolgy (Stratasys Ltd, Eden Prairie, Minn., USA) Selective Laser Melting (SLM), Direct Metal Laser Sintering (DMLS), Selective Laser Sintering (SLS), Stereolithography (SLA), and Laminated Object Manufacturing (LOM).

Associating Layer

The associating layer may comprise any of the materials used in the support layer and/or the structuring layer so long as an associating layer according to the present invention is formed and so long as a web material structuring belt according to the present invention is formed comprising a support layer, a structuring layer and an associating layer of the present invention.

Method for Making a Web Material Structuring Belt

In one example of the present invention, a method for making a web material structuring belt, for example a web material structuring papermaking belt, such as a structure-imparting papermaking belt, comprises the steps of:

a. providing a support layer;
b. providing a structuring layer;
c. providing an associating layer; and
d. associating the structuring layer with the support layer by the associating layer such that a web material structuring belt comprising one or more void volumes between the structuring layer and the support layer is formed, is provided.

Non-Limiting Example of Processes for Making Web Material Structuring Belts

The following definitions are applicable to the non-limiting examples of processes for making web material structuring belts according to the present invention.

"Treat" and/or "Treating a layer" and/or "Treatment of a layer" as used herein means that a layer, for example a support layer, a structuring layer and/or an associating layer is exposed to conditions (treated) that allows them to change their physical characteristics and/or properties, for example soften and/or flow and/or solidify.

In one example, a layer is treated to allow it to deform and/or flow and/or migrate and/or penetrate into one or more other layers. Non-limiting examples of such conditions (treatments) that allow a layer to deform and/or flow and/or migrate and/or penetrate include the following:

a) heating a material to soften it, to allow it to deform and/or to flow. For example, to soften could be to heat above the Tg (glass transition temperature) and/or above the melting temperature;

b) applying a plasticizer to soften a material to allow it to deform (A plasticizer is a substance that is added to a material to make it softer and more flexible, to increase its plasticity, to decrease its viscosity, or to decrease friction during its handling in manufacture, and/or to decrease its Tg so that the Tg is below the processing temperature); and/or c) applying an external force to encourage or force the materials to flow such as applying a differential pressure (via vacuum applied to one side, increased pressure on one side, gravity, physical compression applied via a bladder or a roll or multiple rolls, etc.) or by physically pushing the material into the pores of a layer utilizing a patterned penetrating surface (formed on a roll or fabric, etc.).

In one example, a layers is treated to allow it to bond to one or more other layers. Non-limiting examples of such conditions (treatments) that allow a layer to bond include the following:

a) cooling a material to cause it to solidify or to cause an increase in modulus;
b) remove the plasticizing condition;
c) crosslinking a material to cause it to solidify where the crosslinking is driven by heat, moisture, exposure to energy, exposure to a $2^{nd}$ material, etc.; and/or
d) causing the layer of material to chemically bond to the materials found in the other layer that it is penetrating, for example a support layer and/or a structuring layer.

"Creating a layer" and/or "Creation of a layer" as used herein means a layer is formed from a material by one or more layer creating processes. Non-limiting examples of layer creating processes include the following:

a) physical application of a material using various printing techniques such as additive manufacturing printing, screen printing, gravure printing, roll coating, curtain coating, etc;
b) casting a film in a nip or a vat or extruding a flat layer of material. This film can be modified to create textures upon one or both surfaces, to create apertures, by having materials applied to one or both surfaces of the film to aid in lamination or some other function of the layer (such as process hygiene or lubricity across process rolls, etc.). The film can comprise more than one layer with each layer comprising the same material as the other layer or a different material than the other layer(s);
c) casting a film with a mask to form a layer, where that mask can be patterned, textured or wherein the casting surface is smooth or textured; and/or
d) extrusion of elements other than a film, such as filaments.

"Modifying a layer" and/or "Modification of layer" as used herein means exposing a layer's surface to conditions to result in a physical change of the layer's surface to form a different physical surface of the layer. Non-limiting examples of conditions that modify a layer's surface including the following:

a) application of additional materials to a layer's surface to create additional zones (which may comprise protuberances, discrete and/or continuous regions, etc.). The zones can be used to improve lamination and/or can be part of a structuring layer's surface, for example a structuring layer's web material contacting surface;

b) subjecting a layer's surface to laser engraving and/or laser ablation 1) to create protuberances on the layer's surface and/or at least two of the layer's surfaces, such as opposing surfaces of the layer, and/or 2) to create apertures in the layer's surface, which in one example penetrate entirely through the layer; and/or c) application of additional materials in quantities necessary to improve adhesion between the layer's surface being modified and a separate layer of material; and/or d) treatment of a layer's surface to soften it, then application of a textured surface to the softened layer's surface to transfer a texture from the textured surface to the layer's surface. The treatment to soften the layer can comprise temperature, plasticizers, etc. The textured surface can comprise a woven fabric, a nonwoven fabric, a textured belt, a textured roll (such as a hard roll such as steel or another metal or a hardened rubber, etc.), or any other technique.

"Embedment material" as used herein with respect to a support layer and/or structuring layer means a material present in a support layer and/or structuring layer that can be treated to penetrate and extend into a support layer or a structuring layer resulting in a web material structuring belt.

Belt Making Example 1: Associating Layer Extends into Support Layer

First, in one example of FIG. 5A, create an associating layer 16 comprising an embedment layer, in this case discrete portions of the associating layer 16 on a first surface of a support layer 12. Next, treat the associating layer 16 embedment layer to allow it to penetrate into the support layer 12. Next, treat the embedment layer so that it bonds forming a laminate with the support layer 12 where the associating layer 16 and support layer 12 are associated. Then, associate the laminate with a structuring layer 14 via the associating layer 16. Finally, treat the associating layer 16 and/or the structuring layer 14 so that the associating layer 16 and/or the structuring layer 14 bond to the other layer forming a web material structuring belt 10 according to the present invention that comprises one or more void volumes.

Belt Making Example 2: Associating Layer Extends into Support Layer and Structuring Layer First, as generally described in U.S. Pat. No. 5,624,790, a sufficient amount of photosensitive resinous material, a portion of which ultimately forms the structuring layer, is directly applied to a surface of a clear barrier film, for example Clear Dura-Lar film commercially available from Grafix, Maple Heights, Ohio, such that the resulting structuring layer exhibits a maximum height of about 28 mils. The photosensitive resinous material is then cured using a mask having a pattern of transparent and opaque regions, for example as described in U.S. Pat. No. 5,624,790 and a light of an activating wavelength. The mask pattern is similar to that shown in U.S. Pat. No. 6,200,419. After curing of the photosensitive resinous material through the transparent regions of the mask, the mask is removed, any uncured photosensitive resinous material are removed by a shower, such as a resin wash shower, and then cured resin still on the barrier film is dried. The cured photosensitive resinous material, which forms the structuring layer, exhibits a maximum height of about 28 mils. After drying of the structuring layer, an associating layer is applied to the structuring layer; namely, 2 mm wide lines of silicone adhesive commercially available as GE500 Silicone, Henkel Corporation, Bridgewater, NJ (associating layer) spaced 15 mm apart are applied to the structuring layer surface opposite the clear barrier film. The structuring layer surface with silicone adhesive present thereon while the structuring layer is still carried on the clear barrier film is then brought into contact with a surface of a support layer according to the present invention. 345 $N/m^2$ of pressure is then applied to the support layer/associating layer/structuring layer multi-layer structure and is maintained until the silicone adhesive has cured. The silicone adhesive penetrates into the support layer and structuring layer and entangles and/or wraps the components, for example filaments and/or fibers of one or more of the support layer and structuring layer, rather than physically and/or chemically bonding to the components, such that a silicone adhesive layer having a thickness of about 0.7 mm between the layers is formed. This silicone adhesive layer included void regions. Once cured, the clear barrier film is removed from the structuring layer and discarded. The resulting web material structuring belt comprises the support layer, the associating layer (silicone adhesive) and the structuring layer, which is present in the form of a pattern according to the mask. The resulting web material structuring belt comprises one or more void volumes between the support layer and the structuring layer. The resulting web material structuring belt exhibits the following properties: 1) a Peak Peel Force value of 5.5 N; 2) an Energy value of 1.3 J/m both as measured according to the 180° Free Peel Test Method described herein.

Belt Making Example 3: Associating Layer Extends into Support Layer and Structuring Layer First, as generally described in U.S. Pat. No. 5,624,790, a sufficient amount of photosensitive resinous material, a portion of which ultimately forms the structuring layer, is directly applied to a surface of a clear barrier film, for example Clear Dura-Lar film commercially available from Grafix, Maple Heights, Ohio, such that the resulting structuring layer exhibits a maximum height of about 28 mils. The photosensitive resinous material is then cured using a mask having a pattern of transparent and opaque regions, for example as described in U.S. Pat. No. 5,624,790 and a light of an activating wavelength. The mask pattern is similar to that shown in U.S. Pat. No. 6,200,419. After curing of the photosensitive resinous material through the transparent regions of the mask, the mask is removed, any uncured photosensitive resinous material are removed by a shower, such as a resin wash shower, and then cured resin still on the barrier film is dried. The cured photosensitive resinous material, which forms the structuring layer, exhibits a maximum height of about 28 mils. After drying of the structuring layer, an associating layer is applied to the structuring layer; namely, 2 mm wide lines of silicone adhesive commercially available as GE500 Silicone, Henkel Corporation, Bridgewater, NJ (associating layer) spaced 15 mm apart are applied to the structuring layer surface opposite the clear barrier film. The structuring layer surface with silicone adhesive present thereon while the structuring layer is still carried on the clear barrier film is then brought into contact with a surface of a support layer, which is different from the support layer of Example 2, according to the present invention. 345 $N/m^2$ of pressure is then applied to the support layer/associating layer/structuring layer multi-layer structure and is maintained until the silicone adhesive has cured. The silicone adhesive penetrates into the support layer and structuring layer and entangles and/or wraps the components, for example filaments and/or fibers of one or more of the support layer and structuring layer, rather than physically and/or chemically bonding to the components, such that a silicone adhesive layer having a thickness of about 0.7 mm between the layers is formed. This silicone adhesive layer included void regions. Once cured, the clear barrier film is removed from the structuring layer and discarded. The resulting web material structuring belt comprises the support layer, the associating layer (silicone adhesive) and the structuring layer, which is present in the form of a pattern according to the mask. The resulting web material structuring belt comprises one or more void volumes between the support layer and the structuring layer. The resulting web material structuring belt exhibits the following properties: 1) a Peak Peel Force value of 3.8 N; 2) an Energy value of 1.1 J/m both as measured according to the 180° Free Peel Test Method described herein.

Belt Making Example 4: Associating Layer Extends into Support Layer and Structuring Layer First, a bead of silicone adhesive commercially available as GE500 Silicone, Henkel Corporation, Bridgewater, NJ (associating layer) is applied to one side of an ABS plastic mesh "chicken wire" commercially available from Maporch, Ha Noi City, Vietnam (structuring layer). The ABS plastic mesh has 8 mm circular openings connected with 2 mm wide plastic beams. The silicone adhesive is generally applied continuously along the continuous network of 2 mm wide plastic beams. The silicone adhesive carried by the ABS plastic mesh is then placed in contact with a surface, for example an upper surface of a support layer, for example a woven support layer, according to the present invention. 345 $N/m^2$ of pressure is then applied to the support layer/associating layer/structuring layer multi-layer structure and is maintained until the silicone adhesive has cured. The silicone adhesive penetrates into the support layer and structuring layer and entangles and/or wraps the components, for example filaments and/or fibers of one or more of the support layer and structuring layer, rather than physically and/or chemically bonding to the components, such that a silicone adhesive layer having a thickness of about 1.0 mm between the layers is formed. The resulting web material structuring belt comprises one or more void volumes between the support layer and the structuring layer. The resulting web material structuring belt comprises the support layer, the associating layer (silicone adhesive) and the structuring layer (ABS plastic mesh). The resulting web material structuring belt exhibits the following properties: 1) a Peak Peel Force value of 0.6 N; 2) an Energy value of 0.4 J/m both as measured according to the 180° Free Peel Test Method described herein. The air permeability of this resulting web material structuring belt is about 731 scfm as measured using a Textest Portair FX 3360, TEXTEST AG, Schwerzenbach, Switzerland, using a 20.7 mm orifice at a pressure differential of 125 Pascals.

Belt Making Example 5: Associating Layer Extends into Support Layer and Structuring Layer First, a bead of silicone adhesive commercially available as GE500 Silicone, Henkel Corporation, Bridgewater, NJ (associating layer) is applied to one side of an ABS plastic mesh "chicken wire" commercially available from Maporch, Ha Noi City, Vietnam (structuring layer). The ABS plastic mesh has 8 mm circular openings connected with 2 mm wide plastic beams. The silicone adhesive is generally applied continuously along the continuous network of 2 mm wide plastic beams. The silicone adhesive carried by the ABS plastic mesh is then placed in contact with a surface, for example an upper surface of a support layer, for example a woven support layer, according to the present invention. 345 $N/m^2$ of pressure is then applied to the support layer/associating layer/structuring layer multi-layer structure and is maintained until the silicone adhesive has cured. The silicone adhesive penetrates into the support layer and structuring layer and entangles and/or wraps the components, for example filaments and/or fibers of one or more of the support layer and structuring layer, rather than physically and/or chemically bonding to the components, such that a silicone adhesive layer having a thickness of about 0.7 to 1.0 mm between the layers is formed. The resulting web material structuring belt comprises the support layer, the associating layer (silicone adhesive) and the structuring layer (ABS plastic mesh). The resulting web material structuring belt comprises one or more void volumes between the support layer and the structuring layer. The resulting web material structuring belt exhibits the following properties: 1) a Peak Peel Force value of 0.8 N; 2) an Energy value of 0.4 J/m both as measured according to the 180° Free Peel Test Method described herein.

Methods for Making Web Materials

Web materials, for example structured web materials, of the present invention may be made by any suitable process so long as a web material structuring belt is used to make the web material and optionally, impart structure the web material.

In one example of the present invention, a method for making a web material, for example a structured web material, for example a structured fibrous structure, such as a structured wet laid fibrous structure, for example a structured sanitary tissue product comprises the step of depositing web material components onto a web material structuring belt according to the present invention such that a web material, for example a structured web material is formed.

In another example of the present invention, a method for making a web material, for example a structured web material, for example a structured fibrous structure, such as a structured wet laid fibrous structure, for example a structured sanitary tissue product, comprises the step of depositing a plurality of fibrous elements, for example a plurality of fibers and/or filaments, such as a plurality of pulp fibers, for example a plurality of wood pulp fibers, onto a web material structuring belt according to the present invention such that a web material, for example a structured web material is formed.

In even another example of the present invention, a method for making a wet laid fibrous structure, for example a wet laid structured fibrous structure, for example a structured through-air-dried wet laid fibrous structure, comprises the step of depositing a plurality of pulp fibers, for example a plurality of wood pulp fibers, onto a web material structuring belt according to the present invention such that a structured wet laid fibrous structure is formed.

In yet another example of the present invention, a method for making a film, for example a structured film, comprises the step of depositing a film-forming material, for example a polymer, such as a hydroxyl polymer, for example polyvinyl alcohol, onto a web material structuring belt according to the present invention such that a film, for example a structured film is formed.

In still another example of the present invention, a method for making a foam, for example a structured foam, comprises the steps of depositing a foam-forming material, for example a polymer, such as a polyurethane, on to a web material structuring belt according to the present invention such that a foam, for example a structured foam is formed.

In one example, a web material structuring belt according to the present invention can be used in an NTT process. In one example, a description of the NTT process is described in U.S. Pat. No. 10,208,426.

In one example, a web material structuring belt according to the present invention can be used in a QRT process. In one example, a description of the QRT process is described in U.S. Pat. No. 7,811,418.

In one example, a web material structuring belt according to the present invention can be used in a through-air-dried (TAD) process, for example a creped TAD process. In one example, a description of the TAD process is described in U.S. Pat. Nos. 3,994,771, 4,102,737, 4,529,480, 5,510,002 and 8,293,072, and US Patent Publication No. 20210087748.

In one example, a web material structuring belt according to the present invention can be used in an uncreped through-air-dried (UCTAD) process, for example an uncreped TAD process. In one example, a description of the UCTAD process is described in U.S. Pat. Nos. 5,607,551, 6,736,935, 6,887,348, 6,953,516 and 7,300,543.

In one example, a web material structuring belt according to the present invention can be used in an ATMOS process. In one example, a description of the ATMOS process is described in U.S. Pat. No. 7,550,061.

In one example, a web material structuring belt according to the present invention can be used in a conventional wet press (CWP) process. In one example, a description of the CWP process is described in U.S. Pat. No. 6,197,154, and WO9517548.

In one example, a web material structuring belt according to the present invention can be used in a fabric creped and/or belt creped process. In one example, a description of the fabric crepe process is described in U.S. Pat. Nos. 7,399,378, 8,293,072 and 8,864,945.

In one example of the present invention, a method for making a structured web material comprises the step of depositing a plurality of fibrous elements, for example filaments, for example meltblown filaments and/or spunbond filaments, and/or fibers, such as pulp fibers, for example wood pulp fibers, onto a web material structuring belt according to the present invention such that a web material, for example a structured web material is formed. In one example, the method may produce a nonwoven, for example a through-air-bonded, spunbond nonwoven.

Non-Limiting Examples of Web Material Making Processes

Web Material Example 1A—NTT Process—Paper Towel

A structured web material, for example a structured fibrous structure, is made using the NTT process generally described in U.S. Pat. No. 10,208,426.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood fibers and the Eucalyptus fibers are combined in a headbox and deposited onto a press fabric, for example a batted fabric, such as a felt, composed of woven monofilaments and/or multi-filamentous yarns needled with fine synthetic batt fibers, running at a first velocity $V_1$, homogenously to form an embryonic web material. The embryonic web material is then transferred at a shoe press and, optionally, a suction pressure roll, from the press fabric to a web material structuring belt, for example a structure-imparting papermaking belt according to the present invention at a consistency of 40 to 50%. The web material structuring belt is moving at a second velocity, $V_2$, which is approximately the same as the first velocity, $V_1$. The web material is then forwarded on the web material structuring belt along a looped path and can optionally pass over a vacuum box (not shown) to draw out minute folds and further shape the structured web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 10% from the uncalendared sheet to provide a gentle surface smoothing to the dried structured web material.

The single ply reel properties are targeted to a total tensile of 1000 g/in, a basis weight of 16 #/ream (about 26 gsm) and a caliper of 18 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side (side not in contact with the web material structuring belt) or the web material structuring belt side (side contacting the web material structuring belt) of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 g/m$^2$) basis weight and contain 45% by weight Northern Softwood Kraft fibers, 25% Southern Softwood Kraft fibers and 30% by weight Eucalyptus fibers. The multi-ply structured web material, for example two-ply paper towel product is bulky and absorbent.

Web Material—Example 1B—NTT Process—Bath Tissue

A structured web material, for example a structured fibrous structure, is made using the NTT process generally described in U.S. Pat. No. 10,208,426.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-lined mixer.

All three fiber layers delivered from the multi-layered, three-chambered headbox are delivered simultaneously in superposed relation onto a press fabric, for example a batted fabric, such as a felt, composed of woven monofilaments or multi-filamentous yarns needled with fine synthetic batt fibers, running at a first velocity $V_1$, to form a layered embryonic web. The web is then transferred at the shoe press and, optionally, a suction pressure roll from the press fabric to a web material structuring belt, for example a structure-imparting papermaking belt, of the present invention, at a consistency of 40 to 50%. The web material structuring belt is moving at a second velocity, $V_2$, which is approximately the same as the first velocity, $V_1$. The web material is then forwarded on the web material structuring belt along a looped path and can optionally pass over a vacuum box (not shown) to draw out minute folds and further shape the structured web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°.

This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 20% from the uncalendared sheet to provide a gentle surface smoothing to the dried structured web material.

The single ply reel properties are targeted to a total tensile of 700 g/in, a basis weight of 12 #/ream (20 gsm) and a caliper of 12 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 1C—NTT Process—Bath Tissue

A structured web material, for example a structured fibrous structure, is made using the NTT process generally described in U.S. Pat. No. 10,208,426.

A single ply structured web material, for example a single ply structured fibrous structure may be made according to Example 1B, with the exception that its single ply reel properties are targeted to a total tensile of 600 g/in, a basis weight of 14 #/ream (23 gsm) and a caliper of 16 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/m$^2$) basis weight and contain 40% by weight Northern Softwood Kraft fibers and 60% by weight Eucalyptus fibers. The two-ply bath tissue product is soft, flexible and absorbent.

Web Material Example 1D—NTT Process—Bath Tissue

A structured web material, for example a structured fibrous structure, is made using the NTT process generally described in U.S. Pat. No. 10,208,426.

A single ply structured web material, for example a single ply structured fibrous structure may be made according to Example 1B, with the exception that its single ply reel properties are targeted to a total tensile of 500 g/in, a basis weight of 11 #/ream (18 gsm) and a caliper of 10 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/m$^2$) basis weight and contain 40% by weight Northern Softwood Kraft fibers and 60% by weight Eucalyptus fibers. The three-ply bath tissue product is soft, flexible and absorbent.

Web Material Example 2A—QRT Process—Paper Towel

A structured web material, for example a structured fibrous structure, is made using the QRT process generally described in U.S. Pat. No. 7,811,418.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood furnish and the Eucalyptus fibers are combined in a headbox and deposited onto a forming wire, running at first velocity $V_1$, homogeneously to form an embryonic web material and then transferred to a batted fabric, such as a felt, composed of woven monofilaments and/or multi-filamentous yarns needled with fine synthetic batt fibers, running at a second velocity $V_2$. The embryonic web material is compressively dewatered further with an extended nip press. The web material is then pressed against a smooth belt and at the exit of the extended nip press is transferred to the smooth belt running at a third velocity, $V_3$. The web is then forwarded on the smooth belt to a transfer point with a web material structuring belt, for example a structure-imparting papermaking belt, according to the present invention. The web material is transferred to the web material structuring belt, which is running a velocity $V_4$, with suction roll assist. Velocity $V_4$ is approximately 5% slower than velocity $V_3$. The web material is then forwarded on the web material structuring belt along a looped path and can optionally pass over a vacuum box to draw out minute folds and further shape the structured web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a fifth velocity, $V_5$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a sixth velocity, $V_6$, that is about 20% slower than the fifth velocity, $V_5$, of the drying cylinder so that the microfeatures of the structured web material are preserved. The calendar stack gap is set to decrease caliper, for example decrease caliper 10% from the uncalendared sheet to provide a gentle surface smoothing to the dried structured web material.

The single ply reel properties are targeted to a total tensile of 1000 g/in, a basis weight of 16 #/ream (26 gsm) and a caliper of 18 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 $g/m^2$) basis weight and contain 45% by weight Northern Softwood Kraft fibers, 25% Southern Softwood Kraft fibers and 30% by weight Eucalyptus fibers.

Web Material Example 2B—QRT Process—Bath Tissue

A structured web material, for example a structured fibrous structure, is made using the QRT process generally described in U.S. Pat. No. 7,811,418.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a forming wire, running at first velocity $V_1$, to form a layered embryonic web material and then transferred to a batted fabric, such as a felt, composed of woven monofilaments and/or multi-filamentous yarns needled with fine synthetic batt fibers, running at a second velocity $V_2$. The embryonic web material is compressively dewatered further with an extended nip press. The web material is then pressed against a smooth belt and at the exit of the extended nip press is transferred to the smooth belt running at a third velocity, $V_3$. The web is then forwarded on the smooth belt to a transfer point with a web material structuring belt, for example a structure-imparting papermaking belt, according to the present invention. The web material is transferred to the web material structuring belt, which is running a velocity $V_4$, with suction roll assist. Velocity $V_4$ is approximately 5% slower than velocity $V_3$. The web material is then forwarded on the web material structuring belt along a looped path and can optionally pass over a vacuum box to draw out minute folds and further shape the structured web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a fifth velocity, $V_5$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a sixth velocity, $V_6$, that is about 20% slower than the fifth velocity, $V_5$, of the drying cylinder so that the microfeatures of the structured web material are preserved. The calendar stack gap is set to decrease caliper, for example decrease caliper 10% from the uncalendared sheet to provide a gentle surface smoothing to the dried structured web material.

The single ply reel properties are targeted to a total tensile of 700 g/in, a basis weight of 12 #/ream (20 gsm) and a caliper of 12 mils. The web material structuring belt side layer of the single ply is predominately Eucalyptus fibers and 15% by weight of the sheet, the center layer is a blend of NSK fibers (40% by weight of the sheet) and about 5% by weight of the sheet Eucalyptus fibers and the air side layer is predominately Eucalyptus fibers and about 40% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 $g/m^2$) basis weight and contain 40% by weight Northern Softwood Kraft fibers and 60% by weight Eucalyptus fibers. The two-ply bath tissue product is soft, flexible and absorbent.

Web Material Example 2C—QRT Process—Bath Tissue

A structured web material, for example a structured fibrous structure, is made using the QRT process generally described in U.S. Pat. No. 7,811,418.

A single ply structured web material, for example a single ply structured fibrous structure may be made according to Example 2B, with the exception that its single ply reel properties are targeted to a total tensile of 600 g/in, a basis weight of 14 #/ream (23 gsm) and a caliper of 16 mils. The web material structuring belt side layer of the single ply is predominately Eucalyptus fibers and 15% by weight of the sheet, the center layer is a blend of NSK fibers (40% by weight of the sheet) and about 5% by weight of the sheet Eucalyptus fibers and the air side layer is predominately Eucalyptus fibers and about 40% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 $g/m^2$) basis weight and contain 40% by weight Northern Softwood Kraft fibers and 60% by weight Eucalyptus fibers. The two-ply bath tissue product is soft, flexible and absorbent.

Web Material Example 2D—QRT Process—Bath Tissue

A structured web material, for example a structured fibrous structure, is made using the QRT process generally described in U.S. Pat. No. 7,811,418.

A single ply structured web material, for example a single ply structured fibrous structure may be made according to Example 2B, with the exception that its single ply reel properties are targeted to a total tensile of 500 g/in, a basis weight of 11 #/ream (18 gsm) and a caliper of 10 mils. The web material structuring belt side layer of the single ply is predominately Eucalyptus fibers and 15% by weight of the sheet, the center layer is a blend of NSK fibers (40% by weight of the sheet) and about 5% by weight of the sheet Eucalyptus fibers and the air side layer is predominately Eucalyptus fibers and about 40% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 $g/m^2$) basis weight and contain 40% by weight Northern Softwood Kraft fibers and 60% by weight Eucalyptus fibers. The three-ply bath tissue product is soft, flexible and absorbent.

Web Material Example 3A—TAD Process—Paper Towel

A structured web material, for example a structured fibrous structure, is made using the TAD process generally described in U.S. Pat. Nos. 3,994,771, 4,102,737, 4,529,480, 5,510,002 and 8,293,072, and US Patent Publication No. 20210087748.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood furnish and the Eucalyptus fibers are combined in a headbox and deposited onto a forming wire, running at first velocity $V_1$, homogeneously to form an embryonic web material and then transferred at a transfer nip with approximately 10 in Hg vacuum to a web material structuring belt, for example a structure-imparting papermaking belt, according to the present invention at 10% to 25% solids moving at a second velocity, $V_2$, which is about 5% to about 25% slower than the first velocity, $V_1$. The web material is then forwarded on the web material structuring belt along a looped path and passes through at least one, in this case two pre-dryers structuring and at least partially drying the web material to a consistency of from about 55% to about 90% resulting in a dried structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 10% from the uncalendared sheet to provide a gentle surface smoothing to the dried structured web material.

The single ply reel properties are targeted to a total tensile of 1000 g/in, a basis weight of 16 #/ream (26 gsm) and a caliper of 24 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 g/m$^2$) basis weight and contain 45% by weight Northern Softwood Kraft fibers, 25% Southern Softwood Kraft fibers and 30% by weight Eucalyptus fibers. The multi-ply structured web material, for example two-ply paper towel product is bulky and absorbent.

Web Material Example 3B—TAD Process—Bath Tissue

A structured web material, for example a structured fibrous structure, is made using the TAD process generally described in U.S. Pat. Nos. 3,994,771, 4,102,737, 4,529,480, 5,510,002 and 8,293,072, and US Patent Publication No. 20210087748.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a forming wire, running at first velocity $V_1$, to form a layered embryonic web material and then transferred at a transfer nip with approximately 10 in Hg vacuum to a web material structuring belt, for example a structure-imparting papermaking belt, according to the present invention at 10% to 25% solids moving at a second velocity, $V_2$, which is about 0% to about 10% faster than the first velocity, $V_1$. The web material is then forwarded on the web material structuring belt along a looped path and passes through at least one, in this case two pre-dryers structuring and at least partially drying the web material to a consistency of from about 55% to about 90% resulting in a dried structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°.

This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 20% from the uncalendared sheet to provide a gentle surface smoothing to the dried structured web material.

The single ply reel properties are targeted to a total tensile of 700 g/in, a basis weight of 12 #/ream (20 gsm) and a caliper of 18 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 3C—TAD Process—Bath Tissue

A structured web material, for example a structured fibrous structure, is made using the TAD process generally described in U.S. Pat. Nos. 3,994,771, 4,102,737, 4,529,480, 5,510,002 and 8,293,072, and US Patent Publication No. 20210087748.

A single ply structured web material, for example a single ply structured fibrous structure may be made according to Example 3B, with the exception that its single ply reel properties are targeted to a total tensile of 600 g/in, a basis weight of 14 #/ream (23 gsm) and a caliper of 16 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/m$^2$) basis weight and contain 40% by weight Northern Softwood Kraft fibers and 60% by weight Eucalyptus fibers. The two-ply bath tissue product is soft, flexible and absorbent.

Web Material Example 3D—TAD Process—Bath Tissue

A structured web material, for example a structured fibrous structure, is made using the TAD process generally described in U.S. Pat. Nos. 3,994,771, 4,102,737, 4,529,480, 5,510,002 and 8,293,072, and US Patent Publication No. 20210087748.

A single ply structured web material, for example a single ply structured fibrous structure may be made according to Example 3B, with the exception that its single ply reel properties are target to a total tensile of 500 g/M, a basis weight of 11 #/ream (18 gsm) and a caliper of 10 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/m$^2$) basis weight and contain 40% by weight Northern Softwood Kraft fibers and 60% by weight Eucalyptus fibers. The three-ply bath tissue product is soft, flexible and absorbent.

Web Material Example 4A—UCTAD Process—Paper Towel

A structured web material, for example a structured fibrous structure, is made using the UCTAD process generally described in U.S. Pat. Nos. 5,607,551, 6,736,935, 6,887,348, 6,953,516 and 7,300,543.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood furnish and the Eucalyptus fibers are combined in a headbox and deposited onto a forming wire, running at first velocity $V_1$, homogeneously to form an embryonic web material. The web is dewatered to a consistency of approximately 30% using vacuum suction and then transferred to a transfer fabric, running at a second velocity $V_2$, with vacuum shoe assist. The web material is then transferred to a web material structuring belt, for example a structure-imparting papermaking belt, according to the present invention running at a third velocity $V_3$, with vacuum shoe assist, where third velocity, $V_3$ is approximately equal to second velocity, $V_2$ and second velocity, $V_2$ is approximately 20% slower than first velocity, $V_1$. The web material is then forwarded on the web material structuring belt along a looped path and passes through at least one, in this case two pre-dryers structuring and drying the web material to a consistency of greater than 95% resulting in a dried structured web material. The dried structured web material is then conveyed to a reel and wound.

The single ply reel properties are targeted to a total tensile of 1000 g/in, a basis weight of 16 #/ream (26 gsm) and a caliper of 28 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 g/m$^2$) basis weight and contain 45% by weight Northern Softwood Kraft fibers, 25% Southern Softwood Kraft fibers and 30% by weight Eucalyptus fibers. The multi-ply structured web material, for example two-ply paper towel product is bulky and absorbent.

Web Material Example 4B—UCTAD Process—Bath Tissue

A structured web material, for example a structured fibrous structure, is made using the UCTAD process generally described in U.S. Pat. Nos. 5,607,551, 6,736,935, 6,887,348, 6,953,516 and 7,300,543.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a forming wire running at first velocity $V_1$, to form a layered embryonic web material. The web is dewatered to a consistency of approximately 30% using vacuum suction and then transferred to a transfer fabric, running at a second velocity $V_2$, with vacuum shoe assist. The web material is then transferred to a web material structuring belt, for example a structure-imparting papermaking belt, according to the present invention running at a third velocity $V_3$, with vacuum shoe assist, where third velocity, $V_3$ is approximately equal to second velocity, $V_2$ and second velocity, $V_2$ is approximately 20% slower than first velocity, $V_1$. The web material is then forwarded on the web material structuring belt along a looped path and passes through at least one, in this case two pre-dryers structuring and drying the web material to a consistency of greater than 95% resulting in a dried structured web material. The dried structured web material is then conveyed to a reel and wound.

The single ply reel properties are targeted to a total tensile of 700 g/in, a basis weight of 12 #/ream (20 gsm) and a caliper of 22 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 4C—UCTAD Process—Bath Tissue

A structured web material, for example a structured fibrous structure, is made using the UCTAD process generally described in U.S. Pat. Nos. 5,607,551, 6,736,935, 6,887,348, 6,953,516 and 7,300,543.

A single ply structured web material, for example a single ply structured fibrous structure may be made according to Example 4B, with the exception that its single ply reel properties are targeted to a total tensile of 600 g/in, a basis weight of 14 #/ream (23 gsm) and a caliper of 20 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/m$^2$) basis weight and contain 40% by weight Northern Softwood Kraft fibers and 60% by weight Eucalyptus fibers. The two-ply bath tissue product is soft, flexible and absorbent.

Web Material Example 4D—UCTAD Process—Bath Tissue

A structured web material, for example a structured fibrous structure, is made using the UCTAD process generally described in U.S. Pat. Nos. 5,607,551, 6,736,935, 6,887,348, 6,953,516 and 7,300,543.

A single ply structured web material, for example a single ply structured fibrous structure may be made according to Example 4B, with the exception that its single ply reel properties are target to a total tensile of 500 g/M, a basis weight of 11 #/ream (18 gsm) and a caliper of 14 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/m$^2$) basis weight and contain 40% by weight Northern Softwood Kraft fibers and 60% by weight Eucalyptus fibers. The three-ply bath tissue product is soft, flexible and absorbent.

Web Material Example 5A—ATMOS Process—Paper Towel

A structured web material, for example a structured fibrous structure, is made using the ATMOS process generally described in U.S. Pat. No. 7,550,061.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood furnish and the Eucalyptus fibers are combined in a headbox and deposited onto a forming wire running at a first velocity $V_1$, and a web material structuring belt running at a second velocity $V_2$ homogeneously to form an embryonic web material. The approximately 15% consistency embryonic web material is then transferred on the web material structuring belt through a dewatering fabric belt press and suction roll zone increasing the consistency of the web to 30-40%.

The web material being conveyed on the web material structuring belt is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll), the surface of the take up roll moving a fourth velocity, $V_4$ that is approximately equal to the third velocity, $V_3$ of the drying cylinder. The calendar stack gap is set to decrease caliper, for example decrease caliper 10% from the uncalendared sheet to provide a gentle surface smoothing to the dried structured web material.

The single ply reel properties are targeted to a total tensile of 1000 g/in, a basis weight of 16 #/ream (26 gsm) and a caliper of 12 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 g/m$^2$) basis weight and contain 45% by weight Northern Softwood Kraft fibers, 25% Southern Softwood Kraft fibers and 30% by weight Eucalyptus fibers. The multi-ply structured web material, for example two-ply paper towel product is bulky and absorbent.

Web Material Example 5B—ATMOS Process—Bath Tissue

A structured web material, for example a structured fibrous structure, is made using the ATMOS process generally described in U.S. Pat. No. 7,550,061.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a forming wire running at a first velocity $V_1$, and a web material structuring belt running at a second velocity $V_2$ to form a layered embryonic web material. The approximately 15% consistency embryonic web material is then transferred on the web material structuring belt through a dewatering fabric belt press and suction roll zone increasing the consistency of the web to 30-40%.

The web material being conveyed on the web material structuring belt is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll), the surface of the take up roll moving a fourth velocity, $V_4$ that is approximately equal to the third velocity, $V_3$ of the drying cylinder. The calendar stack gap is set to decrease caliper, for example decrease caliper 10% from the uncalendared sheet to provide a gentle surface smoothing to the dried structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°.

This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 20% from the uncalendared sheet to provide a gentle surface smoothing to the dried structured web material.

The single ply reel properties are targeted to a total tensile of 700 g/in, a basis weight of 12 #/ream (20 gsm) and a caliper of 10 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 5C—ATMOS Process—Bath Tissue

A structured web material, for example a structured fibrous structure, is made using the ATMOS process generally described in U.S. Pat. No. 7,550,061.

A single ply structured web material, for example a single ply structured fibrous structure may be made according to Example 5B, with the exception that its single ply reel properties are targeted to a total tensile of 600 g/M, a basis weight of 14 #/ream (23 gsm) and a caliper of 9 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/m$^2$) basis weight and contain 40% by weight Northern Softwood Kraft fibers and 60% by weight Eucalyptus fibers. The two-ply bath tissue product is soft, flexible and absorbent.

Web Material Example 5D—ATMOS Process—Bath Tissue

A structured web material, for example a structured fibrous structure, is made using the ATMOS process generally described in U.S. Pat. No. 7,550,061.

A single ply structured web material, for example a single ply structured fibrous structure may be made according to Example 5B, with the exception that its single ply reel properties are target to a total tensile of 500 g/M, a basis weight of 11 #/ream (18 gsm) and a caliper of 8 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/m$^2$) basis weight and contain 40% by weight Northern Softwood Kraft fibers and 60% by weight Eucalyptus fibers. The three-ply bath tissue product is soft, flexible and absorbent.

Web Material Example 6A—CWP Process—Paper Towel

A structured web material, for example a structured fibrous structure, is made using the CWP process generally described in U.S. Pat. No. 6,197,154, and WO9517548.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood fibers and the Eucalyptus fibers are combined in a headbox and deposited onto a forming wire running at a first velocity $V_1$ homogeneously to form an embryonic web material. The embryonic web material is then transferred at a wet transfer roll to a web material structuring belt running at a second velocity $V_2$, which is approximately equal to the first velocity $V_1$. The web material is then forwarded, at the second velocity $V_2$, on the web material structuring belt and pressed to a consistency of 30-40%. Optionally, the embryonic web material can be transferred to an intermediate wire for further dewatering before being transferred to the web material structuring belt where the speed of the intermediate wire could be equal to or greater than the second velocity $V_2$. The pressing of the web material structuring belt can be accomplished by a nip between two felts.

While being conveyed on the web material structuring belt, the web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the web material is increased, for example to an estimated 97%, before dry creping the web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the web material to remove it from the drying cylinder while minimally disturbing any previously generated structure in the web material that may have been imparted to the web material via the web material structuring belt. After removal from the drying cylinder, the dried web material then travels through a gapped calendar stack (not shown) before the dried web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried web material can be made more stable for any further converting operations, such as embossing. The calendar stack gap is set to decrease caliper, for example decrease caliper 10% from the uncalendared sheet to provide a gentle surface smoothing to the dried web material.

The single ply reel properties are targeted to a total tensile of 1000 g/in, a basis weight of 16 #/ream (26 gsm) and a caliper of 12 mils.

Two or more plies of the dried web material can be combined into a multi-ply web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried web material, independently, may be positioned facing out with respect to the exterior plies of the multi-ply web material. A sheet length of 5.6 inches and 110 sheets are targeted to be wound for the rolled product. Rolled product would have about a 32 #/ream (52 $g/m^2$) basis weight and contain 45% by weight Northern Softwood Kraft fibers, 25% Southern Softwood Kraft fibers and 30% by weight Eucalyptus fibers. The multi-ply web material, for example two-ply paper towel product is bulky and absorbent.

Web Material Example 6B—CWP Process—Bath Tissue

A structured web material, for example a structured fibrous structure, is made using the CWP process generally described in U.S. Pat. No. 6,197,154, and WO9517548.

An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a forming wire running at a first velocity $V_1$, to form a layered embryonic web material. The layered embryonic web material is then transferred at a wet transfer roll to a web material structuring belt running at a second velocity $V_2$, which is approximately equal to the first velocity $V_1$. The web material is then forwarded, at the second velocity $V_2$, on the web material structuring belt and pressed to a consistency of 30-40%. Optionally, the embryonic web material can be transferred to an intermediate wire for further dewatering before being transferred to the web material structuring belt where the speed of the intermediate wire could be equal to or greater than the second velocity $V_2$. The pressing of the web material structuring belt can be accomplished by a nip between two felts.

The web material being conveyed on the web material structuring belt is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll), the surface of the take up roll moving a fourth velocity, $V_4$ that is approximately equal to the third velocity, $V_3$ of the drying cylinder. The calendar stack gap is set to decrease caliper, for example decrease caliper 10% from the uncalendared sheet to provide a gentle surface smoothing to the dried structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°.

This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 20% from the uncalendared sheet to provide a gentle surface smoothing to the dried structured web material.

The single ply reel properties are targeted to a total tensile of 700 g/in, a basis weight of 12 #/ream (20 gsm) and a caliper of 10 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 6C—CWP Process—Bath Tissue

A structured web material, for example a structured fibrous structure, is made using the CWP process generally described in U.S. Pat. No. 6,197,154, and WO9517548.

A single ply structured web material, for example a single ply structured fibrous structure may be made according to Example 6B, with the exception that its single ply reel properties are targeted to a total tensile of 600 g/M, a basis weight of 14 #/ream (23 gsm) and a caliper of 9 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/m$^2$) basis weight and contain 40% by weight Northern Softwood Kraft fibers and 60% by weight Eucalyptus fibers. The two-ply bath tissue product is soft, flexible and absorbent.

Web Material Example 6D—CWP Process—Bath Tissue

A structured web material, for example a structured fibrous structure, is made using the CWP process generally described in U.S. Pat. No. 6,197,154, and WO9517548.

A single ply structured web material, for example a single ply structured fibrous structure may be made according to Example 6B, with the exception that its single ply reel properties are target to a total tensile of 500 g/M, a basis weight of 11 #/ream (18 gsm) and a caliper of 8 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/m$^2$) basis weight and contain 40% by weight Northern Softwood Kraft fibers and 60% by weight Eucalyptus fibers. The three-ply bath tissue product is soft, flexible and absorbent.

Web Material Example 7A—Fabric Creped/Belt Creped Process—Paper Towel

A structured web material, for example a structured fibrous structure, is made using the fabric creped/belt creped process generally described in U.S. Pat. Nos. 7,399,378, 8,293,072 and 8,864,945.

A 3% by weight aqueous slurry of northern softwood kraft (NSK) pulp fibers and southern softwood kraft (SSK) pulp fibers ("softwood furnish") is prepared in a conventional re-pulper. The softwood furnish is refined gently and a 2% solution of a permanent wet strength resin, for example Kymene 5221 marketed by Solenis Incorporated of Wilmington, DE, is added to the softwood furnish stock pipe at a rate of 1% by weight of the dry fibers. Kymene 5221 is added as a wet strength additive. The adsorption of Kymene 5221 to NSK is enhanced by an in-line mixer. A 1% solution of dry strength additive, for example Carboxy Methyl Cellulose (CMC), such as FinnFix 700 available from C. P. Kelco U.S. Inc. of Atlanta, GA, is added after the in-line mixer at a rate of 0.2% by weight of the dry fibers to enhance the dry strength of the fibrous structure.

A 3% by weight aqueous slurry of Eucalyptus pulp fibers, hardwood fibers, is prepared in a conventional re-pulper. A 1% solution of defoamer, for example BuBreak 4330 available from Buckman Labs, Memphis, TN, is added to the Eucalyptus slurry stock pipe at a rate of 0.25% by weight of the dry fibers and its adsorption is enhanced by an in-line mixer.

The softwood fibers and the Eucalyptus fibers are combined in a headbox and deposited onto a batted fabric, such as a felt, composed of woven monofilaments and/or multifilamentous yarns needled with fine synthetic batt fibers, running at a first velocity $V_1$, homogenously to form an embryonic web material. The embryonic web material is then transferred at a belt crepe nip from the felt at a fiber consistency of from about 30 to about 60% to a web material structuring belt moving at a second velocity, $V_2$. The web is then forwarded, at the second velocity, $V_2$, on the web material structuring belt along a looped path, the second velocity, $V_2$ being from about 5% to about 60% slower than the first velocity, $V_1$. The web material structuring belt and web material pass over a vacuum box at about 20 in Hg to draw out minute folds and further shape the web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 45° and is positioned with respect to the drying cylinder to provide an impact angle of about 101°. This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 10% from the uncalendared sheet to provide a gentle surface smoothing to the dried structured web material.

The single ply reel properties are targeted to a total tensile of 1000 g/in, a basis weight of 16 #/ream (26 gsm) and a caliper of 18 mils.

Two or more plies of the dried structured web material can be combined into a multi-ply structured web material, for example a two-ply paper towel product by embossing and laminating the plies together using, for example using a polyvinyl alcohol adhesive, perforating into sheets and winding on a core, or even winding on itself (coreless). Either the air side or the web material structuring belt side of each ply of dried structured web material, independently, may be positioned facing out with respect to the exterior plies of the multi-ply structured web material. A sheet length of 5.6 inches and 110 sheets are targeted to be wound for the rolled product. Rolled product would have about a 32 #/ream (52 g/m$^2$) basis weight and contain 45% by weight Northern Softwood Kraft fibers, 25% Southern Softwood Kraft fibers and 30% by weight Eucalyptus fibers. The multi-ply structured web material, for example two-ply paper towel product is bulky and absorbent.

Web Material Example 7B—Fabric Creped/Belt Creped Process—Bath Tissue

A structured web material, for example a structured fibrous structure, is made using the fabric creped/belt creped process generally described in U.S. Pat. Nos. 7,399,378, 8,293,072 and An aqueous slurry of Eucalyptus pulp fibers, hardwood fibers, is prepared at about 3% fiber by weight using a conventional repulper, then transferred to a hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and distributed in the top and bottom chambers of a multi-layered, three-chambered headbox of a Fourdrinier wet-laid papermaking machine.

Additionally, an aqueous slurry of Eucalyptus pulp fibers, hardwood fibers, is prepared at about 1.5% fiber by weight using a conventional repulper, then transferred to another hardwood fiber stock chest. The Eucalyptus fiber slurry of the hardwood stock chest is pumped through a stock pipe and mixed with an aqueous slurry of Northern Softwood Kraft (NSK) pulp fibers, softwood fibers.

The aqueous slurry of NSK pulp fibers is prepared at about 3% fiber by weight using a conventional repulper, then transferred to the softwood fiber stock chest. The NSK fiber slurry of the softwood stock chest is pumped through a stock pipe to be gently refined. The refined NSK fiber slurry is then mixed with the 1.5% aqueous slurry of Eucalyptus fibers (described in the preceding paragraph) and directed to a fan pump where the NSK slurry consistency is reduced from about 3% by fiber weight to about 0.15% by fiber weight. The 0.15% Eucalyptus/NSK slurry is then directed and distributed to the center chamber of the multi-layered, three-chambered headbox of the Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.26% temporary wet strengthening additive based on the dry weight of the NSK fibers. The absorption of the temporary wet strengthening additive is enhanced by passing the treated slurry through an in-line mixer.

All three fiber layers delivered from the multi-layered, three-chambered headbox are delivered simultaneously in superposed relation onto a batted fabric, such as a felt, composed of woven monofilaments and/or multi-filamentous yarns needled with fine synthetic batt fibers, running at a first velocity $V_1$, homogenously to form an embryonic web material. The embryonic web material is then transferred at a belt crepe nip from the felt at a fiber consistency of from about 30 to about 60% to a web material structuring belt moving at a second velocity, $V_2$. The web is then forwarded, at the second velocity, $V_2$, on the web material structuring belt along a looped path, the second velocity, $V_2$ being from about 5% to about 60% slower than the first velocity, $V_1$. The web material structuring belt and web material pass over a vacuum box at about 20 in Hg to draw out minute folds and further shape the web material into the web material structuring belt resulting in a structured web material.

The structured web material is then pressed & adhered via a nip and chemistry onto a drying cylinder, for example a Yankee dryer, which is sprayed with a creping adhesive, for example a creping adhesive comprising 0.25% aqueous solution of polyvinyl alcohol. The drying cylinder is moving at a third velocity, $V_3$, for example about 1200 fpm. The fiber consistency of the structured web material is increased, for example to an estimated 97%, before dry creping the structured web material with a doctor blade off the drying cylinder. The doctor blade may have a bevel angle, for example the doctor blade has a bevel angle of about 25° and is positioned with respect to the drying cylinder to provide an impact angle of about 81°.

This doctor blade position permits an adequate amount of force to be applied to the structured web material to remove it from the drying cylinder while minimally disturbing the previously generated structure in the structured web material that was imparted to the web material via the web material structuring belt. After removal from the drying cylinder, the dried structured web material then travels through a gapped calendar stack (not shown) before the dried structured web material is reeled onto a take up roll (known as a parent roll). The surface of the take up roll may be moving at a fourth velocity, $V_4$, that is faster, for example about 7% faster, than the third velocity, $V_3$, of the drying cylinder. By reeling at the fourth velocity, $V_4$, some of the foreshortening provided by the creping step is "pulled out," sometimes referred to as a "positive draw," so that the dried structured web material can be made more stable for any further converting operations, such as embossing. The calendar stack gap is set to decrease caliper, for example decrease caliper 20% from the uncalendared sheet to provide a gentle surface smoothing to the dried structured web material.

The single ply reel properties are targeted to a total tensile of 700 g/in, a basis weight of 12 #/ream (20 gsm) and a caliper of 12 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 150 sheets are targeted to be wound for the rolled product. Rolled product would have about a 24 #/ream (39 g/m$^2$) basis weight and contain 40% by weight Northern Softwood Kraft fibers and 60% by weight Eucalyptus fibers. The two-ply bath tissue product is soft, flexible and absorbent.

Web Material Example 7C—Fabric Creped/Belt Creped Process—Bath Tissue

A structured web material, for example a structured fibrous structure, is made using the fabric creped/belt creped process generally described in U.S. Pat. Nos. 7,399,378, 8,293,072 and 8,864,945.

A single ply structured web material, for example a single ply structured fibrous structure may be made according to Example 7B, with the exception that its single ply reel properties are targeted to a total tensile of 600 g/in, a basis weight of 14 #/ream (23 gsm) and a caliper of 16 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a two-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 130 sheets are targeted to be wound for the rolled product. Rolled product would have about a 28 #/ream (46 g/$m^2$) basis weight and contain 40% by weight Northern Softwood Kraft fibers and 60% by weight Eucalyptus fibers. The two-ply bath tissue product is soft, flexible and absorbent.

Web Material Example 7D—Fabric Creped/Belt Creped Process—Bath Tissue

A structured web material, for example a structured fibrous structure, is made using the fabric creped/belt creped process generally described in U.S. Pat. Nos. 7,399,378, 8,293,072 and 8,864,945.

A single ply structured web material, for example a single ply structured fibrous structure may be made according to Example 7B, with the exception that its single ply reel properties are target to a total tensile of 500 g/M, a basis weight of 11 #/ream (18 gsm) and a caliper of 10 mils. The web material structuring belt side layer of the single ply is predominately Eucalyptus fibers and 40% by weight of the sheet, the center layer is a blend of NSK fibers (40% by weight of the sheet) and about 5% by weight of the sheet Eucalyptus fibers and the air side layer is predominately Eucalyptus fibers and about 15% by weight of the sheet.

Two or more plies of the dried structured web material can be combined into a multi-ply structured web material, for example a three-ply bath tissue product by embossing and laminating the plies together using, for example using a polyvinyl alcohol adhesive, applying a surface additive for softening, perforating into sheets and winding on a core, or even winding on itself (coreless). Either the air side or the web material structuring belt side of each ply of dried structured web material, independently, may be positioned facing out with respect to the exterior plies of the multi-ply structured web material. If the air side is positioned out, the proportion of Eucalyptus slurry directed to the top and bottom chambers of the multi-layered headbox can be reversed. A sheet length of 4.0 inches and 140 sheets are targeted to be wound for the rolled product. Rolled product would have about a 30 #/ream (49 g/$m^2$) basis weight and contain 40% by weight Northern Softwood Kraft fibers and 60% by weight Eucalyptus fibers. The three-ply bath tissue product is soft, flexible and absorbent.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products unless otherwise stated. All tests are conducted in such conditioned room. Do not test samples that have defects such as wrinkles, tears, holes, and like. All instruments are calibrated according to manufacturer's specifications.

Emtec Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2° C. and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref. 2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref. 2 samples").

Mount the test sample into the instrument, and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

Roll Diameter Test Method

For this test, the actual web material roll, for example sanitary tissue product roll, is the test sample. Remove all of the test web material rolls from any packaging and allow them to condition at about 23° C.±2° C. and about 50%±2% relative humidity for 24 hours prior to testing. Web material rolls with cores that are crushed, bent or damaged should not be tested.

The diameter of the test web material roll is measured as the Original Roll Diameter described in the Percent Compressibility Test Method below.

Basis Weight Test Method

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in ±0.007 in by 3.500 in ±0.007 in is used to prepare all samples.

Stack six usable units aligning any perforations or folds on the same side of stack. With a precision cutting die, cut the stack into squares. Select six more usable units of the sample; stack and cut in like manner Combine the two stacks to form a single stack twelve squares thick. Measure the mass of the sample stack and record the result to the nearest 0.001 g.

The Basis Weight is calculated in lbs/3000 $ft^2$ or $g/m^2$ as follows:

Basis Weight=(Mass of stack)/[(Area of 1 layer in stack)×(Number of layers)]

For example,

Basis Weight (lbs/3000 $ft^2$)=[[Mass of stack (g)/453.6 (g/lbs)]/[12.25 ($in^2$)/144 ($in^2/ft^2$)×12]]×3000

Or,

Basis Weight ($g/m^2$)=Mass of stack (g)/[79.032 ($cm^2$)/10,000 ($cm^2/m^2$)×12]

Report result to the nearest 0.1 lbs/3000 $ft^2$ or 0.1 $g/m^2$. Sample dimensions can be changed or varied using a similar precision cutter as mentioned above, so as at least 100 square inches of sample area in stack.

Dry Tensile Test Method

Elongation, Tensile Strength, TEA and Tangent Modulus are measured on a constant rate of extension tensile tester with computer interface (a suitable instrument is the EJA Vantage from the Thwing-Albert Instrument Co. West Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Twenty usable units of sanitary tissue product or web are divided into four stacks of five usable units each. The usable units in each stack are consistently oriented with respect to machine direction (MD) and cross direction (CD). Two of the stacks are designated for testing in the MD and two for CD. Using a one inch precision cutter (Thwing Albert) take a CD stack and cut two, 1.00 in ±0.01 in wide by at least 3.0 in long strips from each CD stack (long dimension in CD). Each strip is five usable unit layers thick and will be treated as a unitary specimen for testing. In like fashion cut the remaining CD stack and the two MD stacks (long dimension in MD) to give a total of 8 specimens (five layers each), four CD and four MD.

Program the tensile tester to perform an extension test, collecting force and extension data at an acquisition rate of 20 Hz as the crosshead raises at a rate of 4.00 in/min (10.16 cm/min) until the specimen breaks. The break sensitivity is set to 50%, i.e., the test is terminated when the measured force drops to 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the product of the specimen width (1 in) and the number of usable units in the specimen (5), and then reported as Win to the nearest 1 g/in.

Adjusted Gage Length is calculated as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in), specimen width (in), and number of usable units in the specimen (5). This is reported as g*in/$in^2$ to the nearest 1 g*in/$in^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 190.5 g (38.1 g×5 layers) force and the 5 data points immediately preceding and the 5 data points immediately following it. This slope is then divided by the product of the specimen width (2.54 cm) and the number of usable units in the specimen (5), and then reported to the nearest 1 g/cm.

The Tensile Strength (g/in), Elongation (%), TEA (g*in/$in^2$) and Tangent Modulus (g/cm) are calculated for the four CD specimens and the four MD specimens. Calculate an average for each parameter separately for the CD and MD specimens.

Calculations:

Geometric Mean Tensile=Square Root of [MD Tensile Strength (g/in)×CD Tensile Strength (g/in)]

Geometric Mean Peak Elongation=Square Root of [MD Elongation (%)×CD Elongation (%)]

Geometric Mean TEA=Square Root of [MD TEA (g*in/$in^2$)×CD TEA (g*in/$in^2$)]

Geometric Mean Modulus=Square Root of [MD Modulus (g/cm)×CD Modulus (g/cm)]

Total Dry Tensile Strength (TDT)=MD Tensile Strength (g/in)+CD Tensile Strength (g/in)

Total TEA=MD TEA (g*in/$in^2$)+CD TEA (g*in/$in^2$)

Total Modulus=MD Modulus (g/cm)+CD Modulus (g/cm)

Tensile Ratio=MD Tensile Strength (g/in)/CD Tensile Strength (g/in)

Percent Compressibility Test Method

Figure 6:
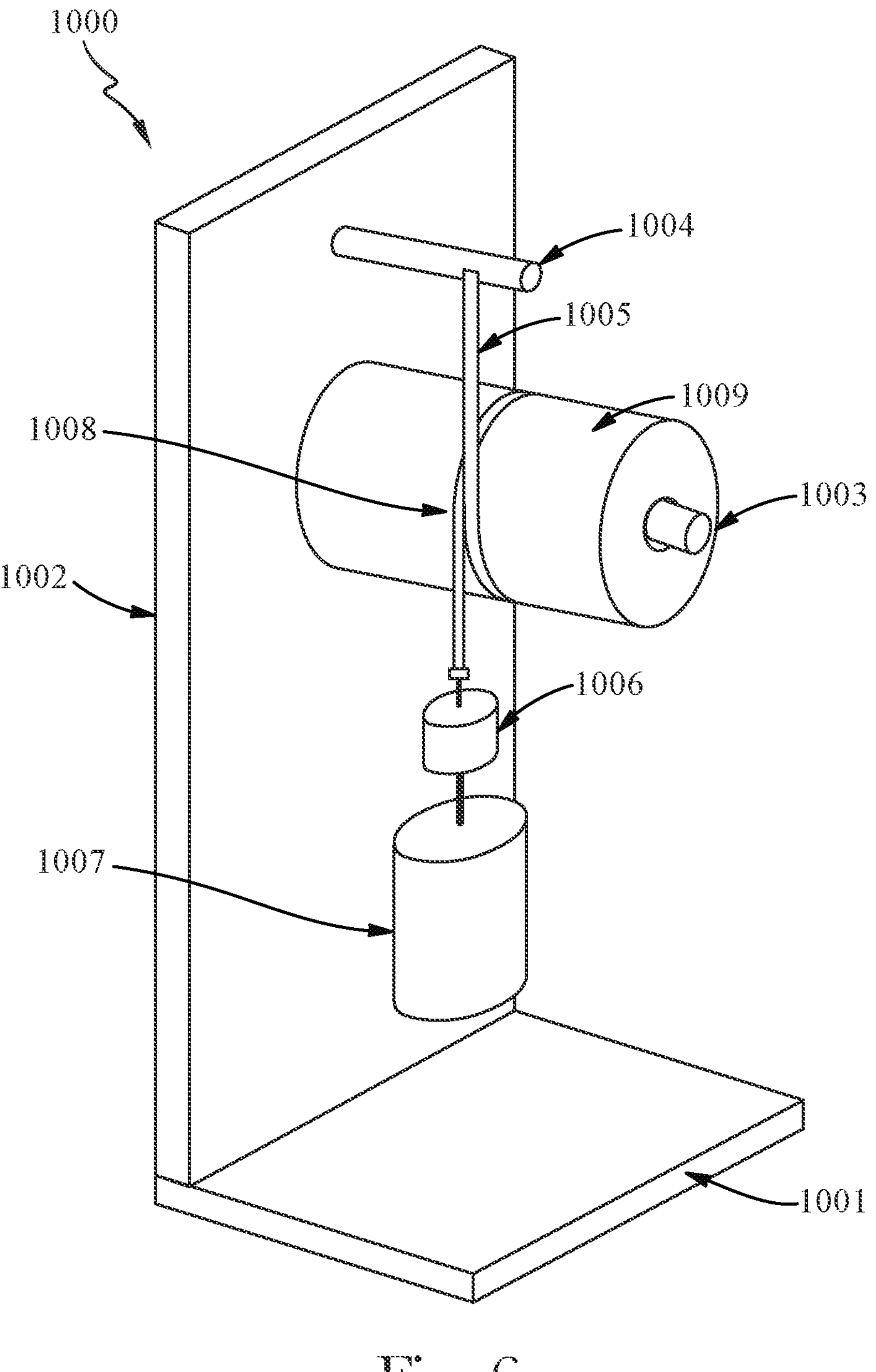
FIG. 6 is a schematic representation of a testing device used in the Percent Compressibility Test Method described herein.

Percent Compressibility of a web material roll is determined using a Roll Tester 1000 as shown in FIG. 6. It is comprised of a support stand made of two aluminum plates, a base plate 1001 and a vertical plate 1002 mounted perpendicular to the base, a sample shaft 1003 to mount the web material test roll, and a bar 1004 used to suspend a precision diameter tape 1005 that wraps around the circumference of the web material test roll. Two different weights 1006 and 1007 are suspended from the diameter tape to apply a confining force during the uncompressed and compressed measurement. All testing is performed in a conditioned room maintained at about 23° C.±2° C. and about 50%±2% relative humidity.

The diameter of the web material test roll 1009, for example a sanitary tissue product roll, is measured directly using a Pi® tape or equivalent precision diameter tape (e.g. an Executive Diameter tape available from Apex Tool Group, LLC, Apex, NC, Model No. W606PD) which converts the circumferential distance into a diameter measurement, so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the web material test roll and longer than the width of the web material test roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted web material test roll. The height of the tape is adjusted such that the zero mark is vertically aligned with the horizontal midline of the sample shaft when a web material test roll is not present.

Condition the samples at about 23° C.±2° C. and about 50%±2% relative humidity for 2 hours prior to testing. Web material test rolls with cores that are crushed, bent or damaged should not be tested. Place the web material test roll 1009 on the sample shaft 1003 such that the direction the web material was rolled onto its core is the same direction the diameter tape will be wrapped around the web material test roll. Align the midpoint of the web material test roll's width with the suspended diameter tape. Loosely loop the diameter tape 1004 around the circumference of the web material test roll 1009, placing the tape edges directly adjacent to each other with the surface of the tape lying flat against the web material test roll. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again, read the roll diameter from the tape and record as the Compressed Roll Diameter to the nearest 0.01 inch. Calculate percent compressibility to the according to the following equation and record to the nearest 0.1%:

$$\%\ \text{Compressibility} = \frac{(\text{Original Roll Diameter}) - (\text{Compressed Roll Diameter})}{\text{Original Roll Diameter}} \times 100$$

Repeat the testing on 10 replicate web material test rolls and record the separate results to the nearest 0.1%. Average the 10 results and report as the Percent Compressibility to the nearest 0.1%.

180° Free Peel Test Method

The 180° Free Peel of laminated web material structuring belts comprising two identifiable material layers, for example a support layer and a structuring layer, is measured on a constant rate of extension tensile tester (a suitable instrument is the MTS Alliance or Criterion using Testworks 4.0 or Testsuite TWe Software, as available from MTS Systems Corp., Eden Prairie, MN) using a load cell for which the forces measured are within 10% to 90% of the limit of the cell. Both the movable (upper) and stationary (lower) jaws of the constant rate of extension tensile tester are fitted with rubber faced grips, wider than the width of a sample of laminated web material structuring belt to be tested (described below). All testing is performed in a room controlled at 23° C.±3 C° and 50%±2% relative humidity.

Samples of a laminated web material structuring belt to be tested are conditioned at about 23° C.±2° C. and about 50° C.±2% ° C. relative humidity for at least two hours before testing. A sample is prepared for testing by cutting a testing strip sample from the laminated web material structuring belt, 25.4 mm±0.1 mm wide, centered along the longitudinal axis of the laminated web material structuring belt, using a cutting die, razor knife or other appropriate means. The testing strip sample must be at least 150 mm in length.

Next, select one end of the testing strip sample and identify the interface where the two identifiable material layers of the laminated web material structuring belt are adjacent to one another. Manually initiate a peel by separating the two ends of the two identifiable material layers longitudinally 50 mm into the testing strip sample to create two leads to grip the testing strip sample for testing. A total of three testing strip samples for a laminated web material structuring belt are prepared for testing.

Program the tensile tester for an extension test collecting force (N) and extension (m) data at 20 Hz with the crosshead being raised at speed of 16.5 mm/s during testing until the testing strip sample is completely separated into two discrete material layers. Ensure the programming only calculates from actual peel data and not from slack at the beginning of the test or zero forces at the end of the test. Slack preload should be set to 20 g. The test should be programmed to end when the testing strip sample is completely separated into two discrete material layers.

Set the gage length to 50 mm Zero the crosshead and load cell. Insert one of the testing strip sample leads in the upper grip and close. Insert the other testing strip sample lead into the lower grip and close. Ensure less than 20 g registers on the load cell prior to starting the testing. Start the test and acquire data. Repeat in like fashion for all three testing strip samples.

Construct a force (N) versus extension (m) curve from the data. Record the Peak Peel Force (N) to the nearest 0.1 N for each sample. From the force (N) versus extension (m) curve calculate the Energy. Energy is the area under the force-extension curve in Joules (J), where 1J=1N*m. Divide this Energy value (J) by the total peel length for the testing strip sample in meters (m) to normalize testing strip samples of different lengths (150 mm or greater) for comparison purposes. Record the Energy per meter of total peel length for the testing strip sample length (J/m) to the nearest 0.1 J/m for each testing strip sample. Calculate and report the arithmetic mean of the Peak Peel Force (N) and Energy (J/m) values for the three replicate testing strip samples.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A web material structuring belt comprising:
- a. a support layer;
- b. a structuring layer; and
- c. an associating layer disposed between the support layer and the structuring layer, wherein the associating layer is mechanically entangled with at least one selected from the group consisting of the support layer, the structuring layer, and combinations thereof, and wherein at least one void volume is present between the support layer and the structuring layer.

2. The web material structuring belt according to claim 1 wherein the support layer comprises a woven fabric.

3. The web material structuring belt according to claim 1 wherein the structuring layer comprises a pattern.

4. The web material structuring belt according to claim 1 wherein the structuring layer comprises a polymer.

5. The web material structuring belt according to claim 1 wherein the structuring layer comprises a film.

6. The web material structuring belt according to claim 1 wherein the structuring layer comprises a resin.

7. The web material structuring belt according to claim 1 wherein the associating layer is mechanically entangled with the support layer.

8. The web material structuring belt according to claim 1 wherein at least a portion of the associating layer extends into the support layer and is bonded to the support layer at one or more bond sites.

9. The web material structuring belt according to claim 8 wherein less than the entire amount of the associating layer extends into the support layer and is bonded to the support layer.

10. The web material structuring belt according to claim 1 wherein the web material structuring belt exhibits a Peak Peel Force of greater than 0.1 N as measured according to the 180° free Peel Test Method.

11. The web material structuring belt according to claim 1 wherein the web material structuring belt exhibits an Energy of greater than 0.1 J/m as measured according to the 180° free Peel Test Method.

12. A method for making a web material structuring belt, the method comprising the steps of:
- a. providing a support layer;
- b. providing a structuring layer; and
- c. associating the structuring layer with the support layer via an associating layer disposed therebetween such that a web material structuring belt comprising one or more void volumes between the structuring layer and the support layer is formed, and wherein the associating layer is mechanically entangled with at least one selected from the group consisting of the support layer, the structuring layer, and combinations thereof.

13. A method for making a web material structuring belt, the method comprising the steps of:
- a. providing a support layer;
- b. forming a structuring layer on the support layer such that an associating layer is disposed therebetween and such that a web material structuring belt comprising the one or more void volumes between the structuring layer and the support layer is formed, and wherein the associating layer is mechanically entangled with at least one selected from the group consisting of the support layer, the structuring layer, and combinations thereof.

14. A method for making a web material structuring belt, the method comprising the steps of:
- a. providing a structuring layer; and
- b. forming a support layer on the structuring layer such that an associating layer is disposed therebetween and such that a web material structuring belt comprising one or more void volumes between the structuring layer and the support layer is formed, and wherein the associating layer is mechanically entangled with at least one selected from the group consisting of the support layer, the structuring layer, and combinations thereof.

* * * * *